US012665957B2

(12) United States Patent
Kim et al.

(10) Patent No.: US 12,665,957 B2
(45) Date of Patent: Jun. 23, 2026

(54) METHOD AND APPARATUS FOR DEFINING ENTIRE PROFILE SUB-FIELD IN ML ELEMENT FOR ML RECONFIGURATION IN WIRELESS LAN SYSTEM

(71) Applicant: LG ELECTRONICS INC., Seoul (KR)

(72) Inventors: Namyeong Kim, Seoul (KR); Jinsoo Choi, Seoul (KR); Insun Jang, Seoul (KR); Sunhee Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 18/550,362

(22) PCT Filed: Mar. 28, 2022

(86) PCT No.: PCT/KR2022/004335
§ 371 (c)(1),
(2) Date: Sep. 13, 2023

(87) PCT Pub. No.: WO2022/211417
PCT Pub. Date: Oct. 6, 2022

(65) Prior Publication Data
US 2025/0080628 A1 Mar. 6, 2025

(30) Foreign Application Priority Data

Mar. 29, 2021 (KR) ........................ 10-2021-0040585
Apr. 1, 2021 (KR) ........................ 10-2021-0042833

(51) Int. Cl.
| *H04L 69/14* | (2022.01) |
| *H04W 76/15* | (2018.01) |
| *H04W 84/02* | (2009.01) |

(52) U.S. Cl.
CPC ............. *H04L 69/14* (2013.01); *H04W 76/15* (2018.02); *H04W 84/02* (2013.01)

(58) Field of Classification Search
CPC ...... H04L 69/14; H04L 69/324; H04W 76/15; H04W 84/02; H04W 76/11; H04W 76/19;
(Continued)

(56) References Cited

U.S. PATENT DOCUMENTS

2021/0014776 A1* 1/2021 Patil ...................... H04W 76/11
2022/0124855 A1* 4/2022 Hu ......................... H04W 76/34
(Continued)

OTHER PUBLICATIONS

Das, Dibakar et al., "CR for CIDs related to NSTR Capability signalling", IEEE 802.11-21/0222r0, Feb. 21, 2021, 6 Pages, https://mentor.ieee.org/802.11/dcn/21/11-21-0222-11-00be-pdt-mac-common-info-ml-element.doc (Year: 2021).*
(Continued)

*Primary Examiner* — Liem H. Nguyen
(74) *Attorney, Agent, or Firm* — LEE, HONG, DEGERMAN, KANG & WAIMEY

(57) ABSTRACT

Proposed are a method and apparatus for transmitting an ML element for ML reconfiguration in a wireless LAN system. In particular, a reception MLD generates a first ML element for ML reconfiguration. The reception MLD transmits the first ML element to a transmission MLD through a first link. The first ML element includes a profile sub-element of a second reception STA. The profile sub-element of the second reception STA includes a first STA control field. The first STA control field includes an entire profile sub-field. When a value of the entire profile sub-field is 1, the profile sub-element of the second reception STA includes entire information for the ML reconfiguration. When the value of entire profile sub-field is 0, the profile sub-element of the second reception STA does not include any information for the ML reconfiguration.

15 Claims, 26 Drawing Sheets

(58) Field of Classification Search
CPC ..... H04W 76/30; H04W 76/34; H04W 84/12; H04W 76/22
See application file for complete search history.

(56) References Cited

U.S. PATENT DOCUMENTS

| 2023/0156492 | A1* | 5/2023 | Gan | ....................... | H04W 48/08 |
| | | | | | 370/329 |
| 2023/0209536 | A1* | 6/2023 | Guo | .................. | H04W 72/1263 |
| | | | | | 370/329 |
| 2023/0284303 | A1* | 9/2023 | Ko | ........................ | H04W 48/12 |
| | | | | | 370/310 |
| 2024/0089738 | A1* | 3/2024 | Gan | ........................ | H04L 69/14 |

OTHER PUBLICATIONS

Chitrakar, Rojanet et.al., "Multi-link Setup clarifications", IEEE 802.11-20/0751r0, May 11, 2020, 18 Pages, https://mentor.ieee.org/802.11/dcn/20/11-20-0751-00-00be-multi-link-setup-clarifications.pptx (Year: 2020).*

\* cited by examiner (a)

| L-LTF | L-STF | L-SIG | Data |
|---|---|---|---|

PPDU Format (IEEE 802.11a/g)

| L-LTF | L-STF | L-SIG | SIG A | HT-SFT | HT-LFT | HT-LFT | ... | HT-LFT | Data |
|---|---|---|---|---|---|---|---|---|---|

HT PPDU Format (IEEE 802.11n)

| L-LTF | L-STF | L-SIG | VHT-SIG A | VHT-SFT | VHT-LFT | VHT-SIG B | Data |
|---|---|---|---|---|---|---|---|

VHT PPDU Format (IEEE 802.11ac)

Variable durations per HE-LTF symbol

4μs per symbol

| 8μs | 8μs | 4μs | 4μs | 8μs | 4μs | 4μs | | | | |
|---|---|---|---|---|---|---|---|---|---|---|
| L-LTF | L-STF | L-SIG | RL-SIG | HE-SIG A | HE-SIG B | HE-STF | HE-LTF | ... | HE-LTF | Data | PE |

| Length | cascade indication | CS required | HE-SIG-A info | CP and LTF type | Trigger Type |
|---|---|---|---|---|---|
| 1210 | 1220 | 1230 | 1240 | 1250 | 1260 |
| 12 | 1 | 1 | TBD | TBD | TBD |

Bits :

FIG. 10

| L-STF | L-LTF | L-SIG | RL-SIG | U-SIG | EHT-SIG | EHT-STF | EHT-LTF | Data |

FIG. 12

| Multi-link STA | | |
|---|---|---|
| 5GHz | 6GHz | |
| STA 1 Link 1 | STA 2 Link 2 | STA 3 Link 3 |

METHOD AND APPARATUS FOR DEFINING ENTIRE PROFILE SUB-FIELD IN ML ELEMENT FOR ML RECONFIGURATION IN WIRELESS LAN SYSTEM

CROSS-REFERENCE TO RELATED APPLICATION(S)

This application is the National Stage filing under 35 U.S.C. 371 of International Application No. PCT/KR2022/004335, filed on Mar. 28, 2022, which claims the benefit of earlier filing date and right of priority to Korean Application Nos. 10-2021-0040585 filed on Mar. 29, 2021, and 10-2021-0042833 filed on Apr. 1, 2021, the contents of which are all incorporated by reference herein in their entirety.

TECHNICAL FIELD

The present specification relates to a multi-link operation in a wireless LAN system, and more particularly, to a method and apparatus for defining a complete profile subfield in an ML element for ML reconfiguration.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for defining a complete profile subfield in an ML element for ML reconfiguration in a wireless LAN system.

An example of this specification proposes a method for defining a complete profile subfield in an ML element for ML reconfiguration.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for using a complete profile suitable for a Multi-Link (ML) element for performing ML reconfiguration between transmitting and receiving MLDs. The ML element corresponds to (ML) Reconfiguration Multi-Link element, a first transmitting STA connected to a first receiving STA included in the receiving MLD through a first link may correspond to a peer AP, and second to fourth transmitting STAs connected through different links (second to fourth links) may correspond to different APs.

A receiving multi-link device (MLD) generates a first multi-link (ML) element for ML reconfiguration.

The receiving MLD transmits the first ML element to a transmitting MLD through a first link.

The transmitting MLD includes a first transmitting station (STA) operating on the first link and a second transmitting STA operating on a second link. The receiving MLD includes a first receiving STA operating on the first link, and a second receiving STA operating on the second link.

The first ML element includes a profile subelement of the second receiving STA. The profile subelement of the second receiving STA includes a first STA control field. The first STA control field includes a complete profile subfield.

When a value of the complete profile subfield is 1, the profile subelement of the second receiving STA includes complete information for the ML reconfiguration. When a value of the complete profile subfield is 0, the profile subelement of the second receiving STA does not include any information for the ML reconfiguration.

Specifically, when a value of the first request type subfield is 1, the ML reconfiguration may be set as an operation of adding or modifying a link. When a value of the first request type subfield is 0, the ML reconfiguration may be set to an operation of deleting a link.

For example, when a third link is added or the second link is modified due to a connection from the second transmitting STA to the third transmitting STA based on the ML reconfiguration, the value of the complete profile subfield may be set to 1, and the complete information for the ML reconfiguration may include identifier information of the third link and complete information of the second receiving STA. In this case, by setting the value of the complete profile subfield to 1, the receiving MLD may transmit the first ML element by including information on the third link to be created or information on the second link to be changed, and complete information of the second receiving STA requesting the ML reconfiguration.

When the second link is deleted based on the ML reconfiguration, the value of the complete profile subfield may be set to 0. In this case, by setting the value of the complete profile subfield to 0, the receiving MLD may transmit the first ML element without including information of the second link and any information of the second receiving STA, thereby reducing unnecessary overhead.

That is, this embodiment proposes a method in which the complete profile subfield of the first ML element is defined differently from the existing one for the ML reconfiguration. The receiving MLD may inform the transmitting MLD whether information for requesting the ML reconfiguration is included based on the complete profile subfield.

According to the embodiment proposed in this specification, by redefining the existing full profile subfields, necessary information can be included or unnecessary information can be excluded according to the type of ML resetting, so the overhead required to change the settings of some links of the transmission and reception MLD can be reduced.

BRIEF DESCRIPTION OF THE DRAWINGS

FIG. 4 illustrates an example of a PPDU used in an IEEE standard.

FIG. 10 illustrates an example of a PPDU used in the present specification.

FIG. 12 is an example of a structure in which one MLD has several Links.

DETAILED DESCRIPTION

Figure 1:
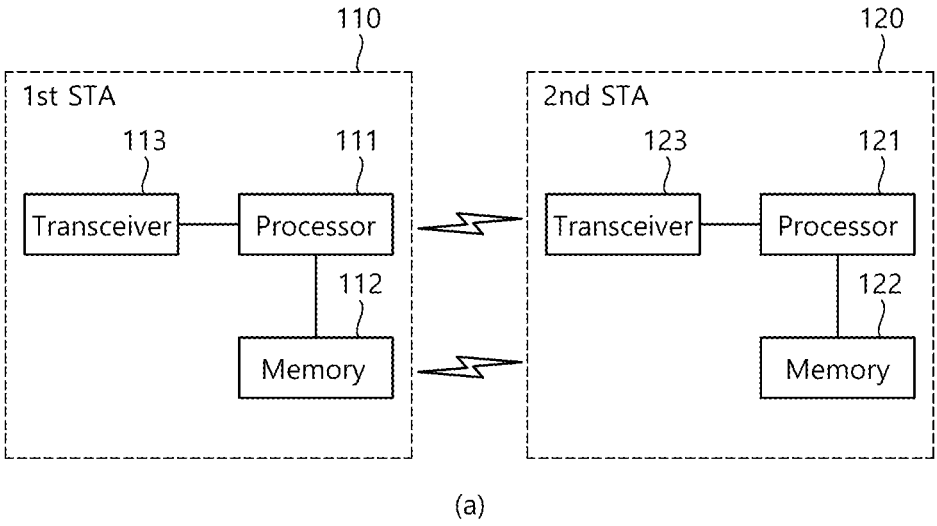
FIG. 1 shows an example of a transmitting apparatus and/or receiving apparatus of the present specification.
Figure 1:
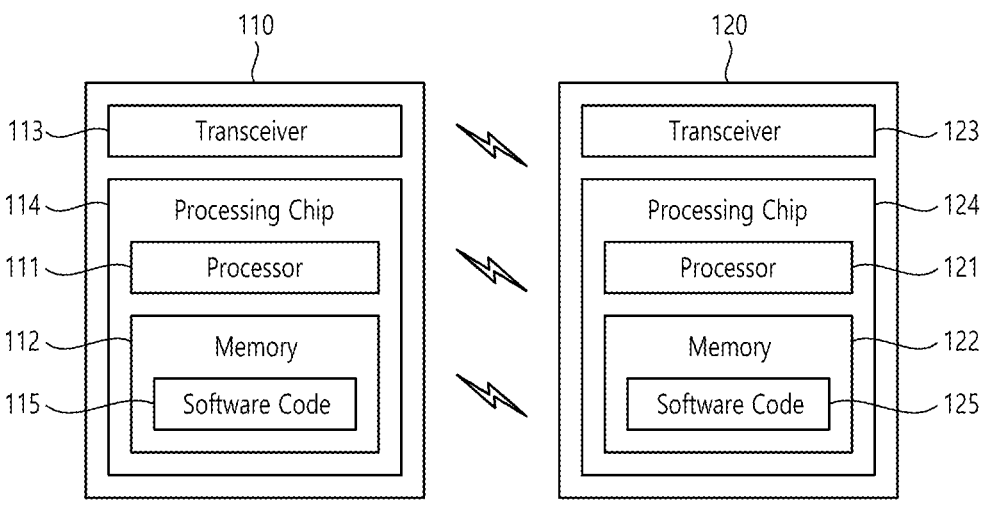

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU: 2) an operation of determining/configuring/obtaining a time resource or frequency resource (e.g., a subcarrier resource) or the like used for the sub-field (SIG, STF, LTF, Data) included the PPDU: 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU: 4) a power control operation and/or power saving operation applied for the to STA; and 5) an operation related determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
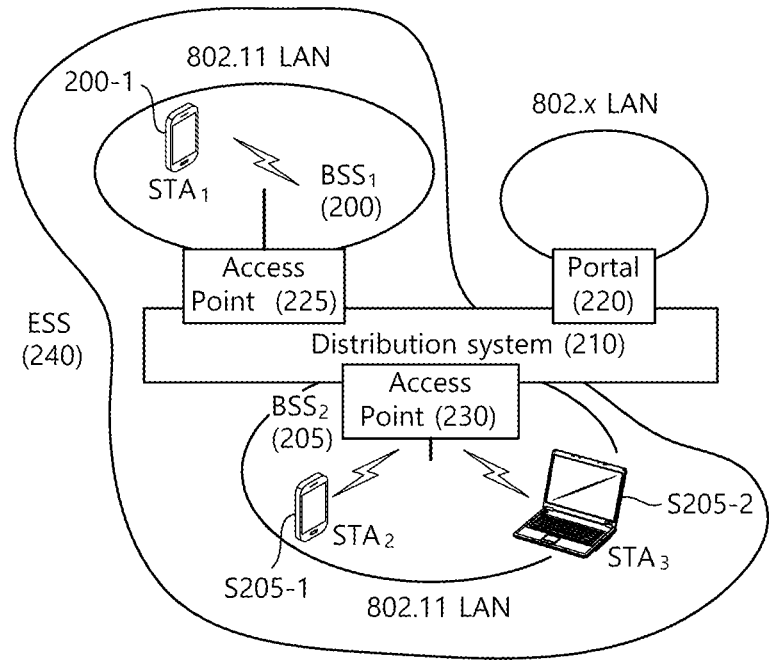
FIG. 2 is a conceptual view illustrating the structure of a wireless local area network (WLAN).
Figure 2:
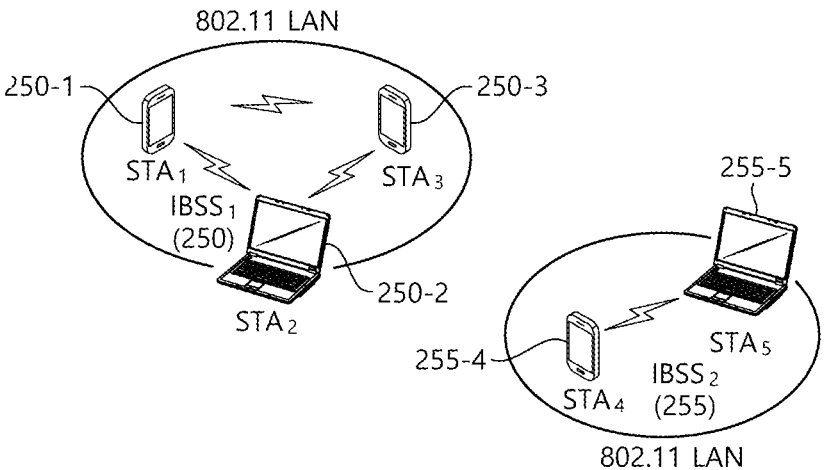

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
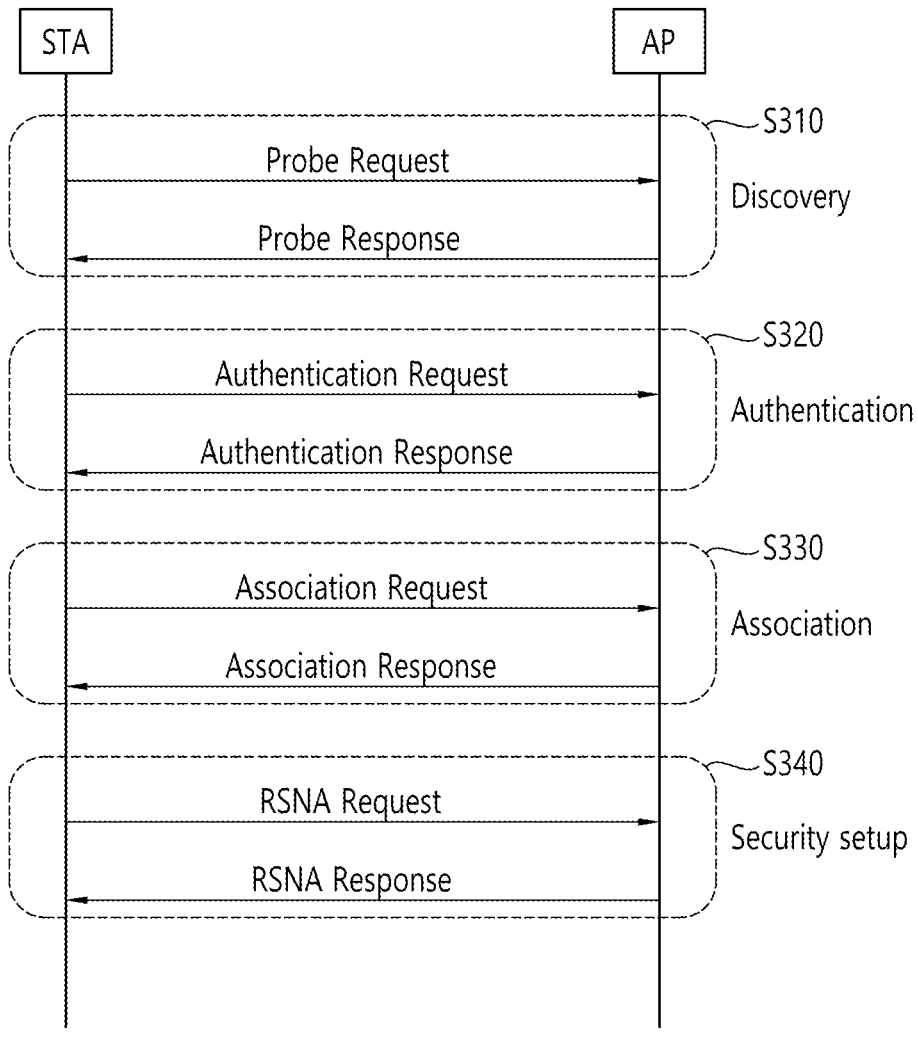
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Figure 5:
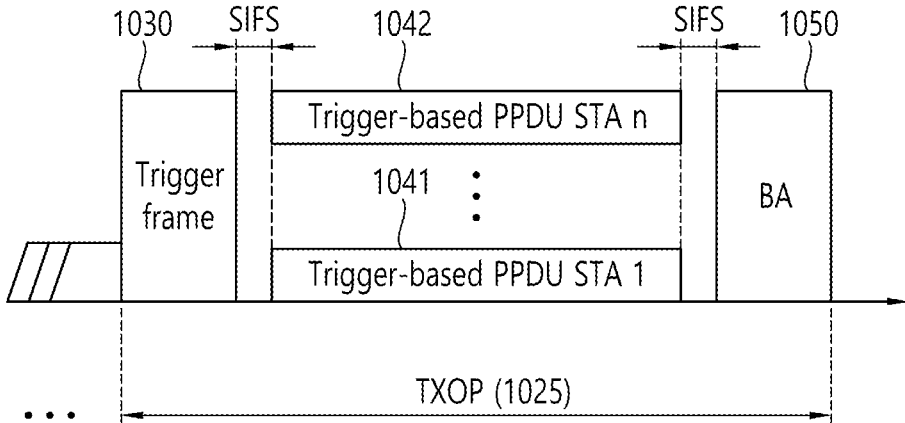
FIG. 5 illustrates an operation based on UL-MU.

FIG. 5 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
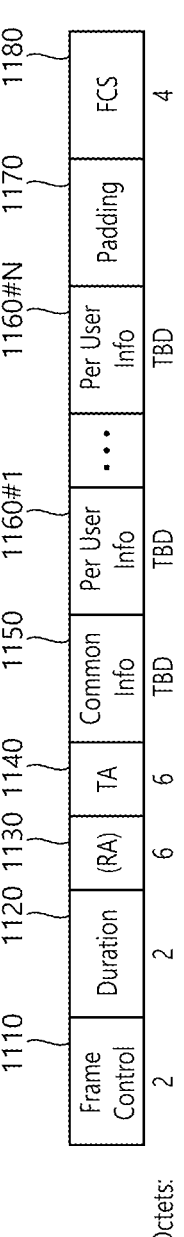
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence field 1180.

Each of the per user information fields 1160 #1 to 1160 #N shown in FIG. 6 may include a plurality of subfields.

Figure 7:
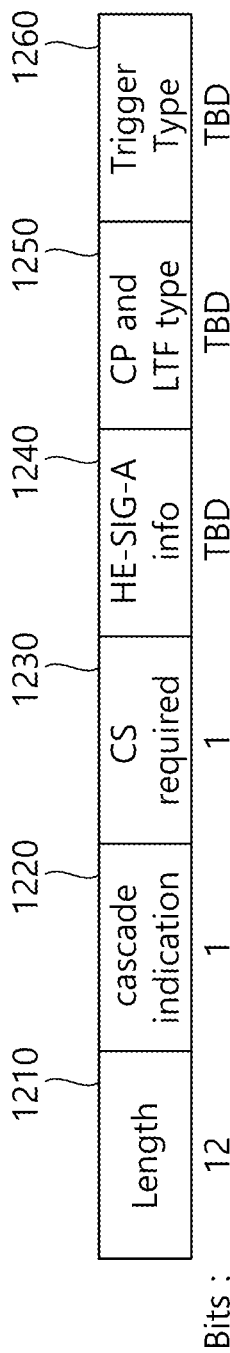
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
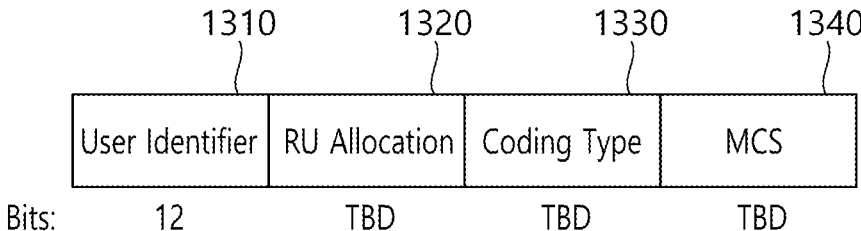
FIG. 8 illustrates an example of a subfield included in a per user information field.

FIG. 8 illustrates an example of a subfield included in a per user information field. A user information field 1300 of FIG. 8 may be understood as any one of the per user information fields 1160 #1 to 1160 #N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 9:
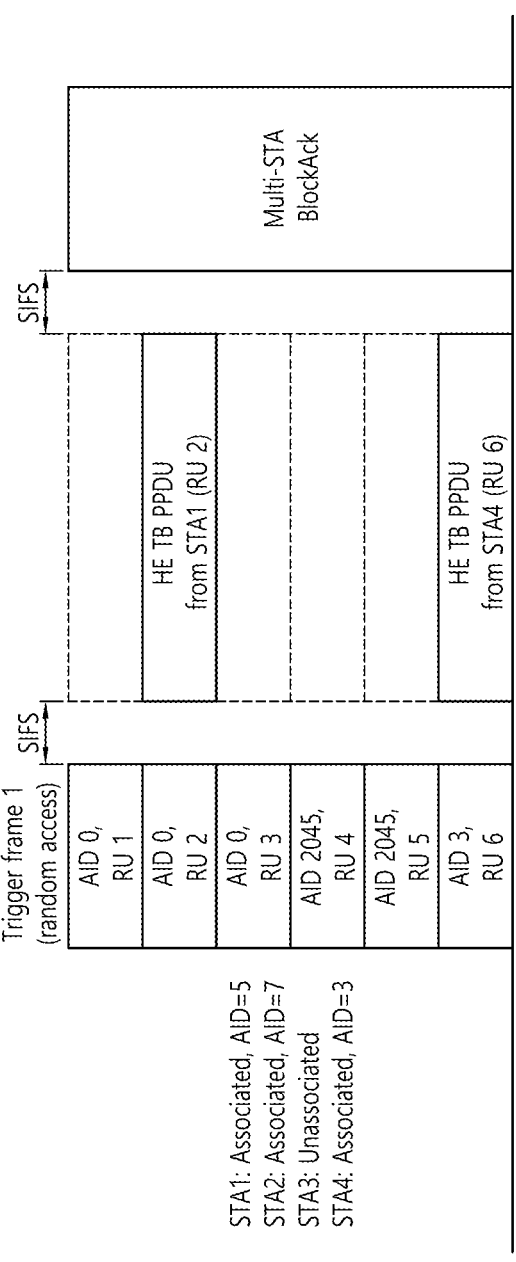
FIG. 9 describes a technical feature of the UORA scheme.

FIG. 9 describes a technical feature of the UORA scheme.

A transmitting STA (e.g., an AP) may allocate six RU resources through a trigger frame as shown in FIG. 9. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 8. Information related to the RU 1 to RU 6 may be included, for example, in the RU allocation field 1320 of FIG. 8. AID=0 may imply a UORA resource for an associated STA, and AID=2045 may imply a UORA resource for an un-associated STA. Accordingly, the 1st to 3rd RU resources of FIG. 9 may be used as a UORA resource for the associated STA, the 4th and 5th RU resources of FIG. 9 may be used as a UORA resource for the un-associated STA, and the 6th RU resource of FIG. 9 may be used as a typical resource for UL MU.

In the example of FIG. 9, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 9, since an AID (e.g., AID=3) of the STA4 is included in a trigger frame, a resource of the RU 6 is allocated without backoff.

Specifically, since the STA1 of FIG. 9 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 9 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 9 is an un-associated STA, the total number of eligible RA RUs for the STA3 is 2 (RU 4, RU 5), and thus the STA3 decreases the OBO counter by 2 but the OBO counter is greater than 0.

Hereinafter, a PPDU transmitted/received in a STA of the present specification will be described.

Figure 10:
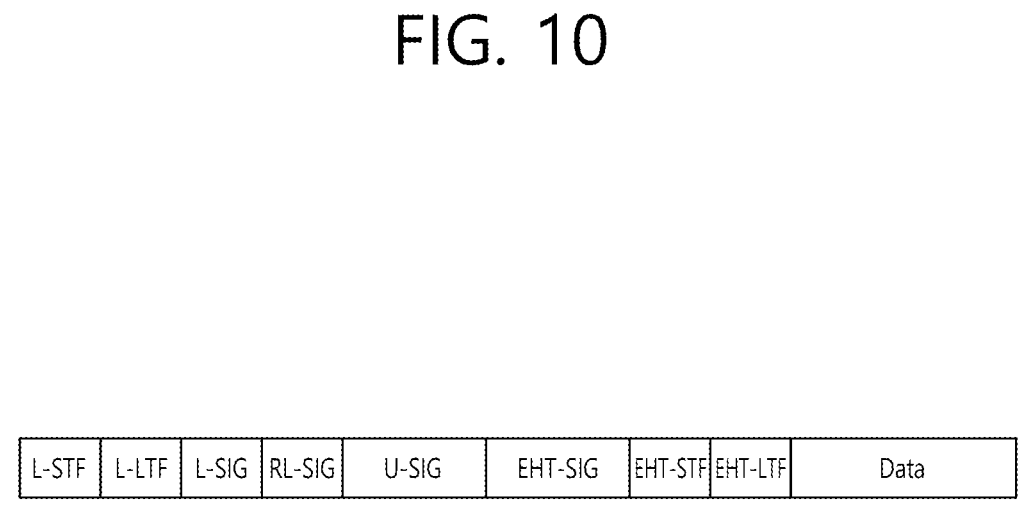

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 KHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth: 2) a field including information related to an MCS scheme applied to EHT-SIG: 3) an indication field including information regarding whether a dual subcarrier modulation (DCM scheme is applied to EHT-SIG: 4) a field including information related to the number of symbol used for EHT-SIG: 5) a field including information regarding whether the EHT-SIG is generated across a full band: 6) a field including information related to a type of EHT-LTF/STF; and 7) information related to a field indicating an EHT-LTF length and a CP length.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
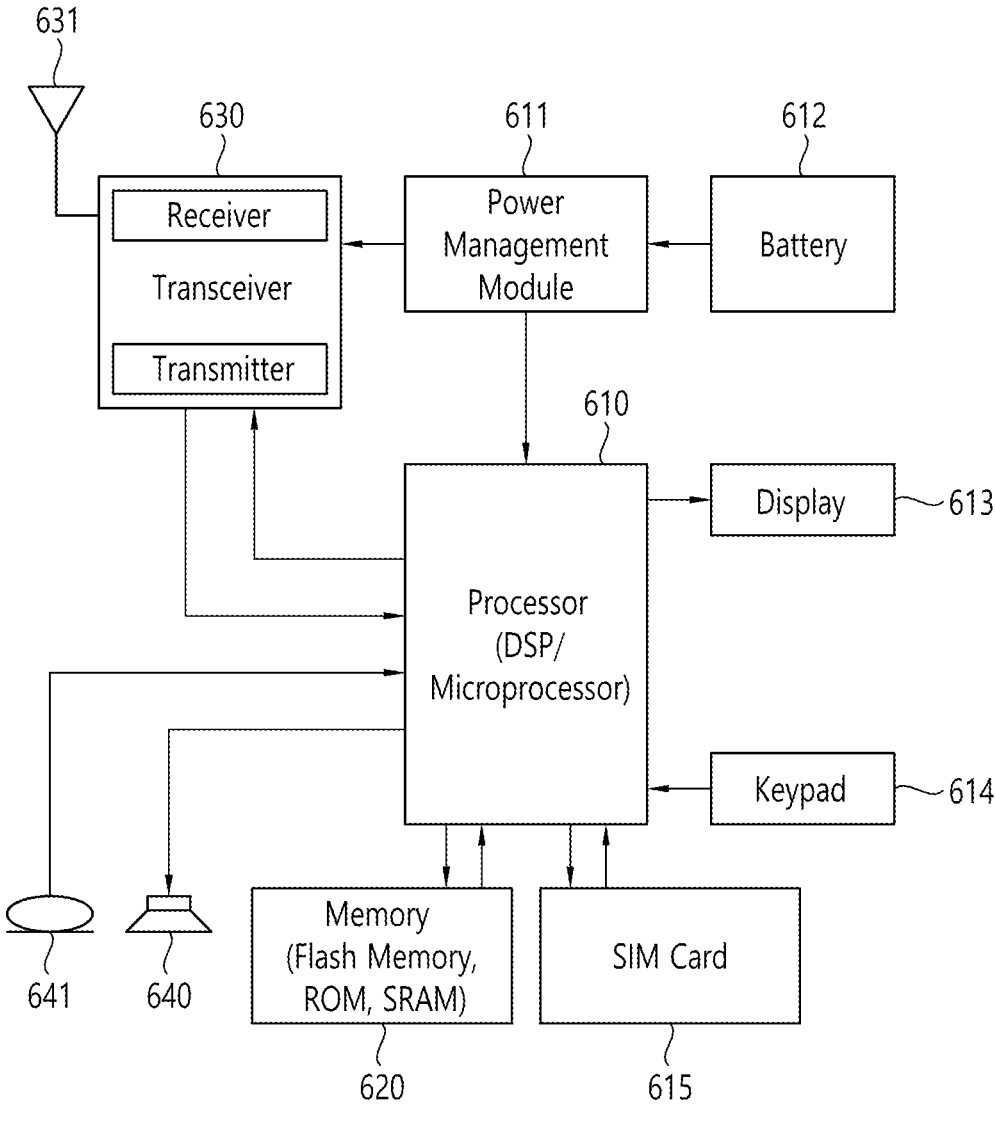
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Hereinafter, technical features of multi-link (ML) supported by the STA of the present specification will be described.

STAs (AP and/or non-AP STA) of the present specification may support multi-link (ML) communication. ML communication may mean communication supporting a plurality of links. Links related to ML communication may include channels (e.g., 20/40/80/160/240/320 MHz channels) of the 2.4 GHz band, the 5 GHz band, and the 6 GHz band.

A plurality of links used for ML communication may be set in various ways. For example, a plurality of links supported by one STA for ML communication may be a plurality of channels in the 2.4 GHz band, a plurality of channels in the 5 GHz band, and a plurality of channels in the 6 GHz band. Alternatively, a plurality of links may be a combination of at least one channel within the 2.4 GHz band (or 5 GHZ/6 GHz band) and at least one channel within the 5 GHz band (or 2.4 GHZ/6 GHz band). Meanwhile, at least one of a plurality of links supported by one STA for ML communication may be a channel to which preamble puncturing is applied.

The STA may perform ML setup to perform ML communication. ML setup may be performed based on management frames or control frames such as Beacon, Probe Request/Response, and Association Request/Response. For example, information on ML setup may be included in element fields included in Beacon, Probe Request/Response, and Association Request/Response.

When ML setup is completed, an enabled link for ML communication may be determined. The STA may perform frame exchange through at least one of a plurality of links determined as an enabled link. For example, an enabled link may be used for at least one of a management frame, a control frame, and a data frame.

When one STA supports a plurality of Links, a transmitting/receiving device supporting each Link may operate like one logical STA. For example, one STA supporting two links may be expressed as one ML device (Multi Link Device: MLD) including a first STA for a first link and a second STA for a second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

More specific features of the ML setup are described below.

An MLD (AP MLD and/or non-AP MLD) may transmit information about a link that the corresponding MLD can support through ML setup. Link-related information may be configured in various ways. For example, link-related information includes at least one of 1) information on whether the MLD (or STA) supports simultaneous RX/TX operation, 2) information on the number/upper limit of uplink/downlink links supported by the MLD (or STA), 3) information on the location/band/resource of uplink/downlink link supported by MLD (or STA), 4) type of frame available or preferred in at least one uplink/downlink link (management, control, data etc.), 5) available or preferred ACK policy information on at least one uplink/downlink link, and 6) information on available or preferred TID (traffic identifier) on at least one uplink/downlink link. The TID is related to the priority of traffic data and is represented by 8 types of values according to the conventional wireless LAN standard. That is, 8 TID values corresponding to 4 access categories (AC) (AC_BK (background), AC_BE (best effort), AC_VI (video), AC_VO (voice)) according to the conventional wireless LAN standard may be defined.

For example, it may be set in advance that all TIDs are mapped for uplink/downlink links. Specifically, if negotiation is not done through ML setup, all TIDs may be used for ML communication, and if mapping between uplink/downlink links and TIDs is negotiated through additional ML setup, the negotiated TIDs may be used for ML communication.

A plurality of links that can be used by the transmitting MLD and the receiving MLD related to ML communication can be set through ML setup, and this can be called an enabled link. The enabled link can be called differently in a variety of ways. For example, it may be called various expressions such as a first link, a second link, a transmitting link, and a receiving link.

After the ML setup is complete, the MLD may update the ML setup. For example, the MLD may transmit information about a new link when updating information about a link is required. Information about the new link may be transmitted based on at least one of a management frame, a control frame, and a data frame.

The device described below may be the apparatus of FIGS. 1 and/or 11, and the PPDU may be the PPDU of FIG. 10. A device may be an AP or a non-AP STA. A device described below may be an AP multi-link device (MLD) or a non-AP STA MLD supporting multi-link.

In EHT (extremely high throughput), a standard being discussed after 802.11ax, a multi-link environment in which one or more bands are simultaneously used is considered. When a device supports multi-link, the device can simultaneously or alternately use one or more bands (e.g., 2.4 GHZ, 5 GHz, 6 GHZ, 60 GHZ, etc.).

In the following specification, MLD means a multi-link device. The MLD has one or more connected STAs and has one MAC service access point (SAP) that communicates with the upper link layer (Logical Link Control, LLC). MLD may mean a physical device or a logical device. Hereinafter, a device may mean an MLD.

In the following specification, a transmitting device and a receiving device may mean MLD. The first link of the receiving/transmitting device may be a terminal (e.g., STA or AP) included in the receiving/transmitting device and performing signal transmission/reception through the first link. The second link of the receiving/transmitting device may be a terminal (e.g., STA or AP) that transmits/receives a signal through the second link included in the receiving/transmitting device.

In IEEE802.11be, two types of multi-link operations can be supported. For example, simultaneous transmit and receive (STR) and non-STR operations may be considered. For example, STR may be referred to as asynchronous multi-link operation, and non-STR may be referred to as synchronous multi-link operation. Multi-links may include multi-bands. That is, multi-links may mean links included in several frequency bands or may mean multiple links included in one frequency band.

EHT (11be) considers multi-link technology, where multi-link may include multi-band. That is, multi-link can represent links of several bands and multiple multi-links within one band at the same time. Two major multi-link operations are being considered. Asynchronous operation, which enables TX/RX simultaneously on several links, and synchronous operation, which is not possible, are being considered. Hereinafter, a capability that enables simultaneous reception and transmission on multiple links is referred to as STR (simultaneous transmit and receive), an STA having STR capability is referred to as STR MLD (multi-link device), and an STA that does not have STR capability is referred to as a non-STR MLD.

In the following specification, for convenience of explanation, it is described that the MLD (or the processor of the MLD) controls at least one STA, but is not limited thereto. As described above, the at least one STA may transmit and receive signals independently regardless of MLD.

According to an embodiment, an AP MLD or a non-AP MLD may have a structure having a plurality of links. In other words, a non-AP MLD can support multiple links. A non-AP MLD may include a plurality of STAs. A plurality of STAs may have Link for each STA.

In the EHT standard (802.11be standard), the MLD (Multi-Link Device) structure in which one AP/non-AP MLD supports multiple links is considered as a major technology. STAs included in the non-AP MLD may transmit information about other STAs in the non-AP MLD together through one link. Accordingly, there is an effect of reducing the overhead of frame exchange. In addition, there is an effect of increasing the link use efficiency of the STA and reducing power consumption.

Here, multi-link may include multi-band. That is, multi-link can represent links of several bands and multiple multi-links within one band at the same time.

In the EHT wireless LAN system (802.11be), a multi-link concept in which one AP/non-AP device simultaneously supports several links is considered as a major technology. A device that supports Multi-Link is defined as multi-link device (MLD).

Figure 12:
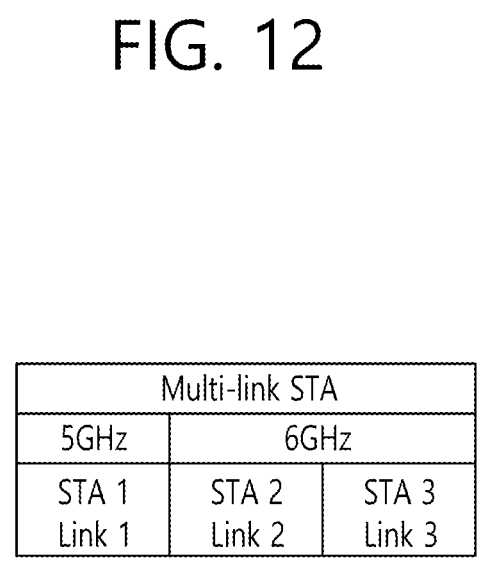

FIG. 12 is an example of a structure in which one MLD has several Links.

Referring to FIG. 12, the MLD has several STAs (STAs 1, 2, and 3) and each STA has a Link (Links 1, 2, and 3).

As such, in the case of an AP/non-AP MLD supporting Multi-Link, each AP of the AP MLD and each STA of the non-AP MLD are connected to each link through a link setup process. And, at this time, the connected Link may be changed or reconnected to another Link by an AP MLD or a non-AP MLD depending on circumstances.

In general, each link between an AP MLD and a non-AP MLD is determined through (re) Association frame exchange during a multi-link setup process. The STA of the MLD that has performed this multi-link setup performs frame exchange through the connected link. An example of AP MLD and non-AP MLD connection through the multi-link setup process is shown in FIG. 13.

Figure 13:
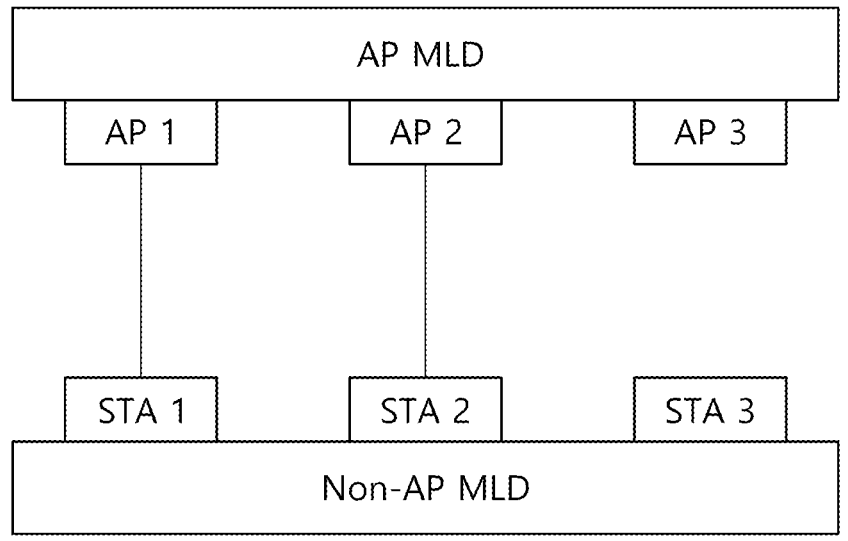
FIG. 13 is an example of a connection structure between an AP MLD and a non-AP MLD through multi-link setup.

FIG. 13 is an example of a connection structure between an AP MLD and a non-AP MLD through multi-link setup.

When STA 1 of the non-AP MLD transmits a (re) association request frame including setup link information for each STA to the AP MLD, and the receiving AP responds with a (re) association response frame that the AP accepts, the non-Multi-link setup is possible for multiple links with one (re) association frame between AP MLD and AP MLD.

For example, in the case of FIG. 13, each of APs 1 and 2 of the AP MLD is connected to Links 1 and 2 for two STAs 1 and 2 of the non-AP MLD through multi-link setup. Each AP and STA performs frame exchange through the connected Link, and it is possible to transmit information of other APs or other STAs through one Link due to the nature of multi-Link.

However, after this multi-link setup process, depending on the situation, you want more efficient frame exchange (e.g. load balancing, interference avoiding, etc.) or in various cases (e.g. STA turn off, etc.), the AP MLD or non-AP MLD may request a link configuration status change (e.g. Link add/Link delete/Link switching).

However, when using an existing (re) association frame, the overhead of setting each link state may be large. This is because the non-AP MLD, which has already performed multi-link setup for several links, cannot disconnect links for only some links but not all links, and if even one link is disconnected, the disassociation process for all links must be performed. In addition, in order for the STA of the non-AP MLD to additionally configure a new link after multi-link setup, it must newly (re) associate all links after disassociation.

In the case of a single link device, since it has only one link, (re) association or disassociation for all links within the device is not a problem, but in the case of an MLD that supports multi-link, all links are Performing (re) association or disassociation every time can be expensive and inefficient.

Therefore, in this embodiment, a new method that can be efficiently configured when an STA of an MLD re-configurates some links is defined.

1. Multi-Link (ML) Re-Configuration

After the multi-link setup process between MLDs, the multi-link connected by the STA of the AP MLD or non-AP MLD may be reconfigured. In this specification, ML Re-configuration is defined as adding/delete/modifying (i.e., switching) a link by an STA without a separate (re) association process for an existing connected multi-link state.

In case of (re) association between existing MLDs, if some of the multi-link setup links are changed, initial state information (e.g. MLD level security key information, etc.) is not maintained, after disassociation of all links, a new multi-link setup must be performed. However, such an operation may cause unnecessary frame exchange overhead.

Therefore, in this specification, several cases of ML Reconfiguration that can change some link states without disassociation or (re) association process are defined, and matters to be considered in such ML Reconfiguration are proposed.

1.1. ML Re-Configuration—Add Link Process

This section describes the process by which the STA of the MLD adds some links among multi-link setup links.

After the multi-link setup process (i.e., after association), the STA of the MLD can create and add a link to the STA without a (re) association process if there is an STA that has not been setup.

Figure 14:
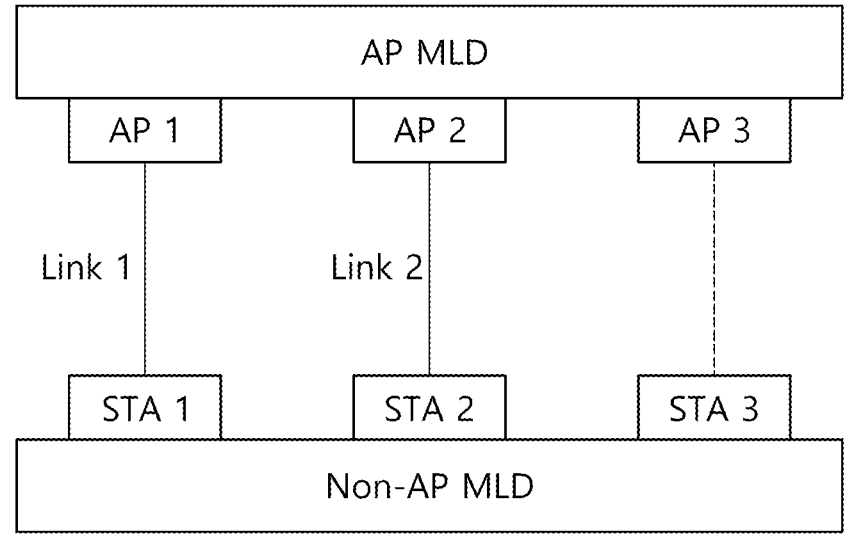
FIG. 14 shows an example of adding a link in ML reconfiguration.

An embodiment for this is shown in FIG. 14.

FIG. 14 shows an example of adding a link in ML reconfiguration.

As shown in FIG. 13, after STA 1 and STA 2 are connected to Link 1 and Link 2 for AP 1 and AP 2 through the existing multi-link setup, link can be additionally added for STA 3 of non-AP MLD. To this end, the non-AP MLD may exchange frames for creating a new link for STA 3 through previously connected Link 1 or Link 2. A request frame for this may use a new frame or an existing frame (e.g. management frame, action frame, etc.).

1.2. ML Re-Configuration-Delete Link Process

This section describes the process by which the STA of the MLD deletes some of the multi-link setup links.

After the multi-link setup process (i.e., after association), the STA of the MLD can remove and delete some of the links among the links set up without disassociation process.

Figure 15:
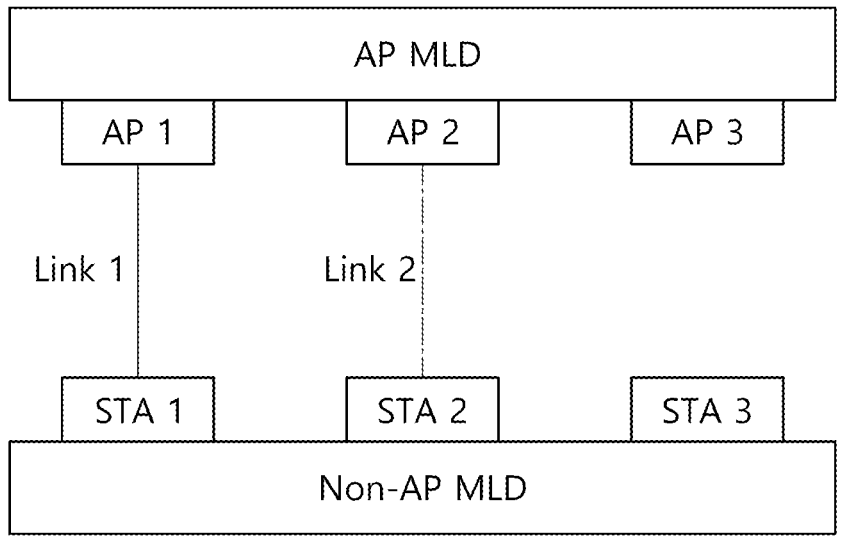
FIG. 15 shows an example of deleting a link in ML reconfiguration.

An embodiment for this is shown in FIG. 15.

FIG. 15 shows an example of deleting a link in ML reconfiguration.

As shown in FIG. 13, after STA 1 and STA 2 are connected to Link 1 and Link 2 for AP 1 and AP 2 through the existing multi-link setup, link can be removed for STA 2 of non-AP MLD. To this end, the non-AP MLD may exchange frames for deleting the link to STA 2 through previously connected Link 1 or Link 2. A request frame for this may use a new frame or an existing frame (e.g. management frame, action frame, etc.).

1.3. ML Re-Configuration-Modify (Switching) Link Process

This section describes the process of modifying (switching) the STA of MLD for some of the multi-link setup links.

After the multi-link setup process (i.e., after association), the STA of the MLD may modify and change some links among the links set up without a (re) association process.

Figure 16:
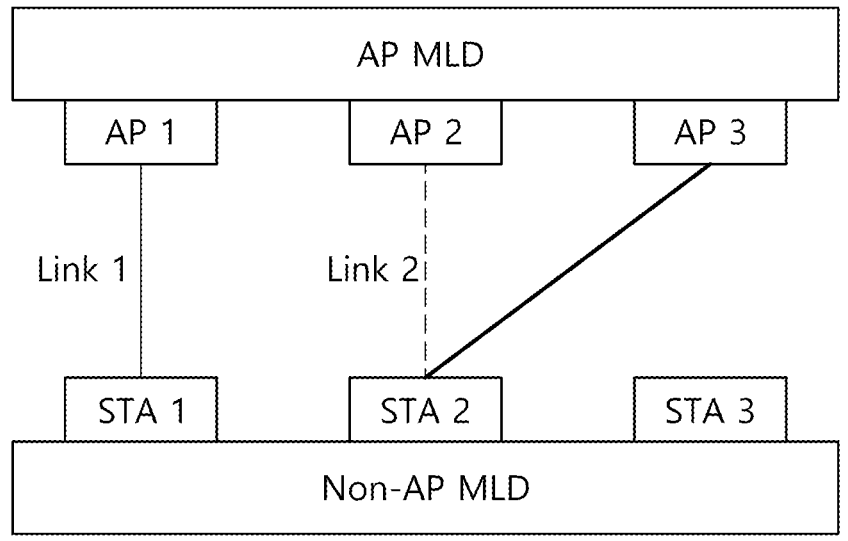
FIG. 16 shows an example of modifying a link in ML reconfiguration.

An embodiment for this is shown in FIG. 16.

FIG. 16 shows an example of modifying a link in ML reconfiguration.

As shown in FIG. 13, after STA 1 and STA 2 are connected to Link 1 and Link 2 for AP 1 and AP 2 through the existing multi-link setup, link can be changed for STA 2 of non-AP MLD. To this end, the non-AP MLD may exchange frames for changing the link to STA 2 through Link 1 or Link 2 connected previously. A request frame for this may use a new frame or an existing frame (e.g. management frame, action frame, etc.).

1.4. Signaling Definition for ML Re-Configuration

This section defines signaling for the MLD reconfiguration process.

MLD requires a container to put information about each STA and AP in a frame in order to ADD/DELETE/MODIFY a link. For this, ML IE (Multi-Link Element) defined in 802.11be can be used.

Figure 17:
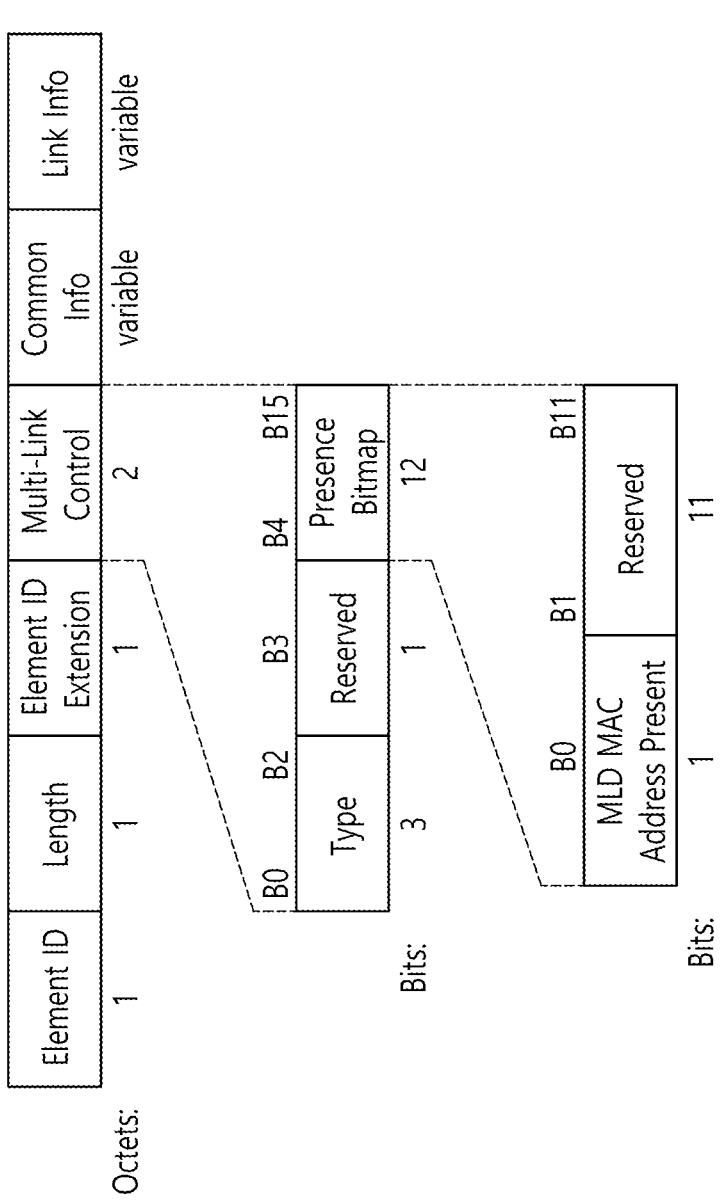
FIG. 17 shows a format of a Multi-Link element.

FIG. 17 shows a format of a Multi-Link element.

The upper part of FIG. 17 shows a Multi-Link element, and the Multi-Link element includes Element ID, Length, Element ID Extension, Multi-Link Control, Common Info, and Link Info fields.

The Multi-Link Control field includes a Type subfield and an MLD MAC Address Present subfield, and the Type subfield is used to distinguish a variant of a Multi-Link element. Various variants of the Multi-Link element are used for various multi-link operations. The format of each variant of the Multi-Link element is as follows.

TABLE 1

| Type subfield value | Multi-Link element variant name |
| --- | --- |
| 0 | Basic Multi-Link element |
| 1 | Probe Request Multi-Link element |
| 2 | (ML) Reconfiguration Multi-Link element |
| 3 | Tunneled Direct Link Setup (TDLS) Multi-Link element |
| 4 | Priority Access Multi-Link element |
| 5-7 | Reserved |

Referring to Table 1, the type of the ML IE is defined through the Type subfield of the Multi-Link Control field of the ML IE. If the value of the Type subfield is 0, the ML IE indicates a Basic variant Multi-Link element, if the value of the Type subfield is 1, the ML IE indicates the Probe Request variant Multi-Link element, and if the value of the Type subfield is 2, the ML IE indicates the ML Reconfiguration variant Multi-Link element.

Referring to FIG. 17, the Common Info field means common information between STAs in the MLD, and specific information about each STA is indicated in the Per-STA Profile of the Link Info field.

The Common Info field includes the MLD MAC Address subfield. When the MLD MAC Address Present subfield is set to 1 (or 0), MAC addresses of STAs in the MLD may be included in the MLD MAC Address subfield.

The Link Info field includes a Per-STA Profile subfield when the optional subelement ID is 0, and includes a Vendor Specific subfield when the optional subelement ID is 221. Optional subelement IDs for Multi-link Element are defined as follows.

TABLE 2

| Subelement ID | Name | Extensible |
| --- | --- | --- |
| 0 | Per-STA Profile | Yes |
| 1-220 | Reserved | |
| 221 | Vendor Specific | Vendor defined |
| 222-255 | Reserved | |

The Link Info field includes a Per-STA Profile subfield for other STAs (STAs operating on a non-association link) within the same MLD.

In this specification, an ML Reconfiguration variant Multi-Link element (or the Reconfiguration Multi-Link element), which is a new ML IE Type for ML Reconfiguration, is newly defined. As described above, when the value of the Type subfield is 2, the ML IE may be defined as an ML Reconfiguration variant Multi-Link element. Hereinafter, a new field included in the ML Reconfiguration variant Multi-Link element is defined.

1) 'Request Type' (sub) field: An indicator for indicating the type of ML Reconfiguration requested for the link (e.g. ADD/DELETE/MODIFY, etc.). The Request Type subfield may be included in the Per-STA Control field of the Per-STA Profile subelement in the ML IE. Through the value of the Request Type subfield, it is possible to indicate which reconfiguration is requested for the link indicated by the current Per-STA Profile subelement. For example, if the value of the 1-bit Request Type subfield is 0, it indicates Link DELETE, and if the value of the Request Type subfield is 1, it indicates Link ADD or Link MODIFY.

Figure 18:
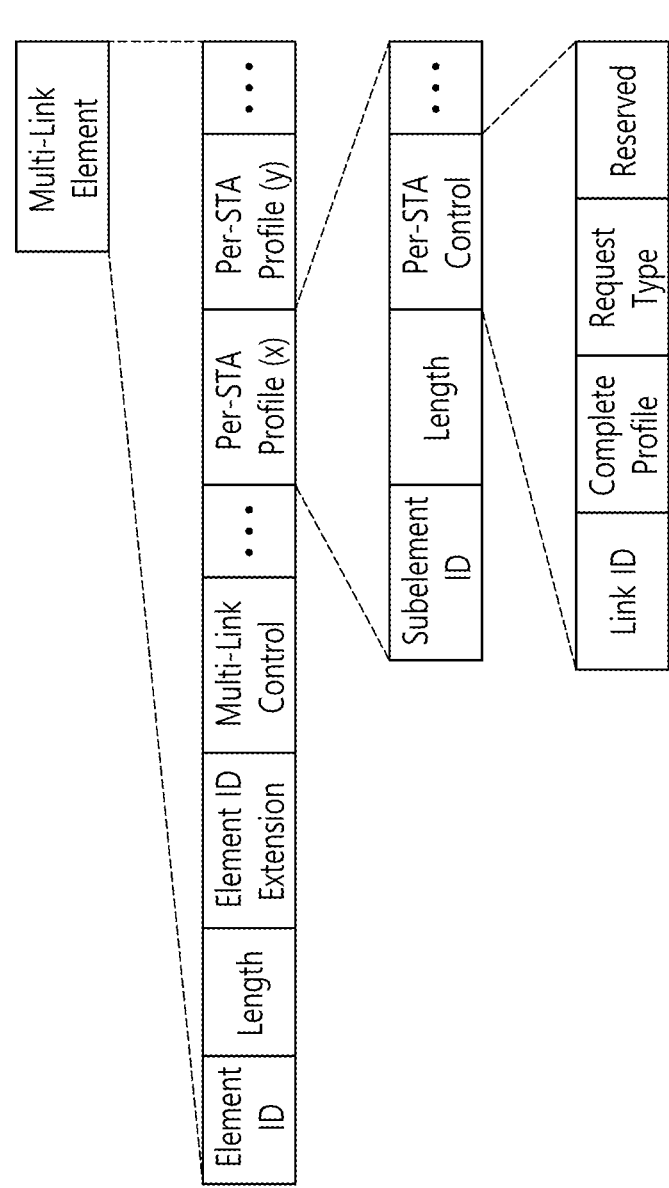
FIG. 18 shows an example of a format of a Per-STA Control field.

An embodiment of the format of the Per-STA Control field for this is shown in FIG. 18.

FIG. 18 shows an example of a format of a Per-STA Control field.

For example, if the MLD is multi-link setup as shown in FIG. 13, and the STA of the non-AP MLD wants to send an ML Reconfiguration request, it includes link indication information corresponding to the Link to be reconfigured in the Link ID field of the Per-STA Profile subelement of the ML IE (ie, ML Reconfiguration variant Multi-Link element), and reconfiguration type is indicated in the corresponding Request Type subfield. If STA 3 wants to create link 3 for AP 3 of AP MLD, the Link ID subfield includes a Link ID value corresponding to Link 3, and the STA of the non-AP MLD transmits a request frame including the ML IE with the Request Type subfield set to 1 through Link 1 or Link 2. If STA 2 of the non-AP MLD wants to delete a link previously connected to AP 2, it includes the Link ID value corresponding to Link 2 in the Link ID subfield, and the STA of the non-AP MLD transmits a request frame including the ML IE with the Request Type subfield set to 0 through Link 1 or Link 2. If STA 2 of the non-AP MLD wants to change the link previously connected to AP 2 to AP3, it includes the Link ID value corresponding to Link 3 in the Link ID subfield, and the STA of the non-AP MLD transmits a request frame including an ML IE in which the Request Type subfield is indicated as 1 through Link 1 or Link 2. The STA sets the same Request Type subfield value for ADD and MODIFY requests, but the AP may recognize this as ADD if there is no previously connected link with respect to the requesting STA, and may recognize it as MODIFY if there is an existing connected link.

The ML Reconfiguration proposed in this specification may also occur for one or more links of the MLD. To this end, it is necessary to define a new field for mapping each STA and a link for resetting.

2) 'Requesting STA ID' (sub) field: An indicator indicating the ID information of the STA currently requesting ML Reconfiguration. The Requesting STA ID subfield may be included in the Per-STA Control field of the Per-STA Profile subelement in the ML IE. Through the value of the Requesting STA ID subfield, information of an STA requesting a link indicated by the Link ID subfield of the current Per-STA Profile subelement may be indicated. For example, when STA 1 of the non-AP MLD and STA 3 request a new link ADD for AP 3, it includes Link ID information for AP 3 in the Link ID subfield of the Per-STA Control field of the Per-STA Profile subelement of the ML IE, and it includes ID information about STA 3 in the Requesting STA ID subfield. The corresponding STA ID indicator may be a new indicator (e.g. 4 bits).

Figure 19:
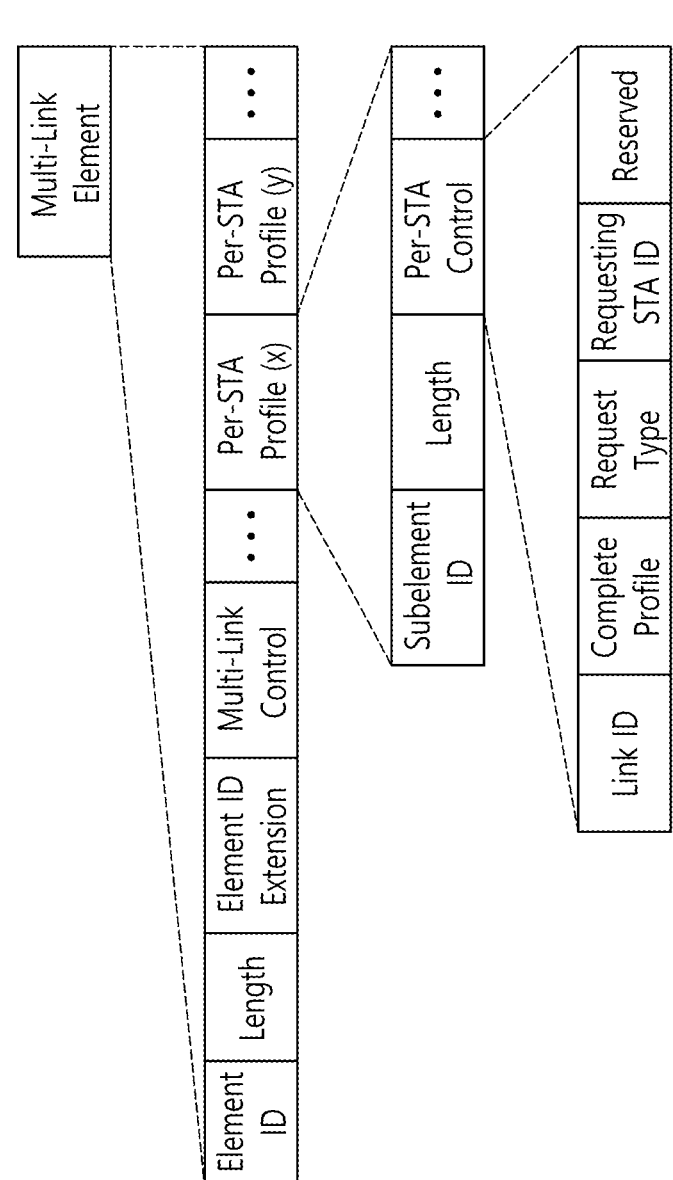
FIG. 19 shows another example of a format of a Per-STA Control field.

An embodiment of the format of the Per-STA Control field for this is shown in FIG. 19.

FIG. 19 shows another example of a format of a Per-STA Control field.

For example, if the MLD is multi-link setup as shown in FIG. 13, and the STA of the non-AP MLD wants to send an ML Reconfiguration request, it transmits the ML IE (i.e., ML Reconfiguration variant Multi-Link element) Include link indication information corresponding to the Link to be reset in the Link ID field of the Per-STA Profile subelement, and it indicates the reconfiguration type in the corresponding Request Type subfield. In addition, the Requesting STA ID subfield includes identifier information of the STA currently requesting the reconfiguration.

If STA3 wants to create link 3 for AP 3 of AP MLD, the Link ID subfield includes a Link ID value corresponding to Link 3, and the Request Type subfield is set to 1, and the STA of the non-AP MLD transmits a request frame including an ML IE including identifier information corresponding to STA 3 in the Requesting STA ID subfield through Link 1 or Link 2. Upon receiving this, the AP may accept a request for STA 3 to create a link with AP 3. Such a request may be more useful when creating more than one link.

For example, if the non-AP MLD wants to create links to STA 3 and STA 4 at the same time and to indicate the AP to create links for each STA, this can be indicated through the Requesting STA ID subfield. If Link 3 for STA 3 and AP 3, and Link 4 for STA 4 and AP 4 are created, respectively, the Link ID subfield of the Per-STA Control field of the Per-STA Profile subelement corresponding to Link 3 includes information indicating AP 3, the Request Type subfield includes information indicating ADD, the Requesting STA ID subfield includes information indicating STA 3, and the Link ID subfield of the Per-STA Control field of the Per-STA Profile subelement corresponding to Link 4 includes information indicating AP 4, the Request Type subfield includes information indicating ADD, and the Requesting STA ID subfield includes information indicating STA 4. In this way, by mapping and transmitting the STA information to request resetting and the information of the AP receiving the resetting request, if the STA has a link that the AP MLD suggests or recommends according to the STA's capability, the non-AP MLD can perform ML reconfiguration for an appropriate link based on this.

The Requesting STA ID subfield can be usefully used even when the STA changes Link.

For example, if STA 2 of the non-AP MLD wants to change the link previously connected to AP 2 to AP 3, the Link ID subfield includes the Link ID value corresponding to Link 3, the Request Type subfield is set to 1, the STA of the non-AP MLD transmits a request frame including an ML IE indicating STA 2 in the Requesting STA ID subfield through Link 1 or Link 2. The AP receiving this can reliably map when a request comes from one or more STAs through the Requesting STA ID subfield.

In this specification, a method of utilizing STA MAC Address information without separately defining a new field to indicate the Requesting STA ID is also considered. To this end, information of the STA requesting ML Reconfiguration may be indicated by including the STA MAC Address field in the Per-STA Profile subelement. If the STA includes the STA MAC Address field in the Per-STA Profile subelement, the STA MAC Address Present subfield for this must be included in the Per-STA Control field. The STA MAC Address Present subfield has a value of 1 when the STA MAC Address subfield exists, and a value of 0 when the STA MAC Address subfield does not exist. An embodiment for this is shown in FIG. 20.

Figure 20:
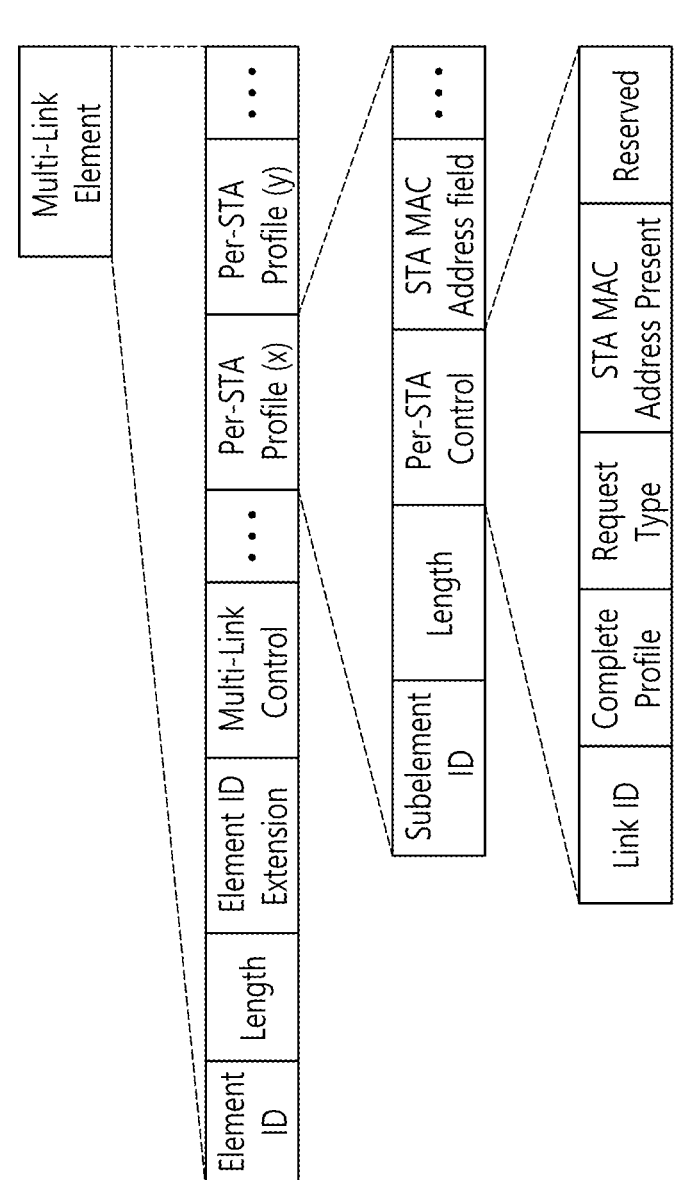
FIG. 20 shows another example of a format of a Per-STA Control field.

FIG. 20 shows another example of a format of a Per-STA Control field.

In the case of FIG. 20, in the same way as in the case of using the Requesting STA ID (sub) field, the identifier information of the requesting STA may be indicated and transmitted to the AP, but the STA MAC Address field is 6 bytes and has a disadvantage in that overhead may be larger than that of the Requesting STA ID (sub) field.

In the present specification, a method of separately instructing a link to be reconfigured when the STA performs ML reconfiguration is also considered. To this end, the following new fields are proposed.

3) 'New Link ID' (sub) field: Link indicator information requesting ML Reconfiguration. The New Link subfield may be included in the Per-STA Control field of the Per-STA Profile subelement in the ML IE. The New Link subfield may be used together with the existing Link ID subfield to indicate the ML reconfiguration operation of the STA in more detail. For example, when the STA changes Link, it may indicate the currently connected Link ID information in the existing Link ID subfield and request a Link change by putting the Link ID information to be changed in the proposed New Link ID subfield.

Figure 21:
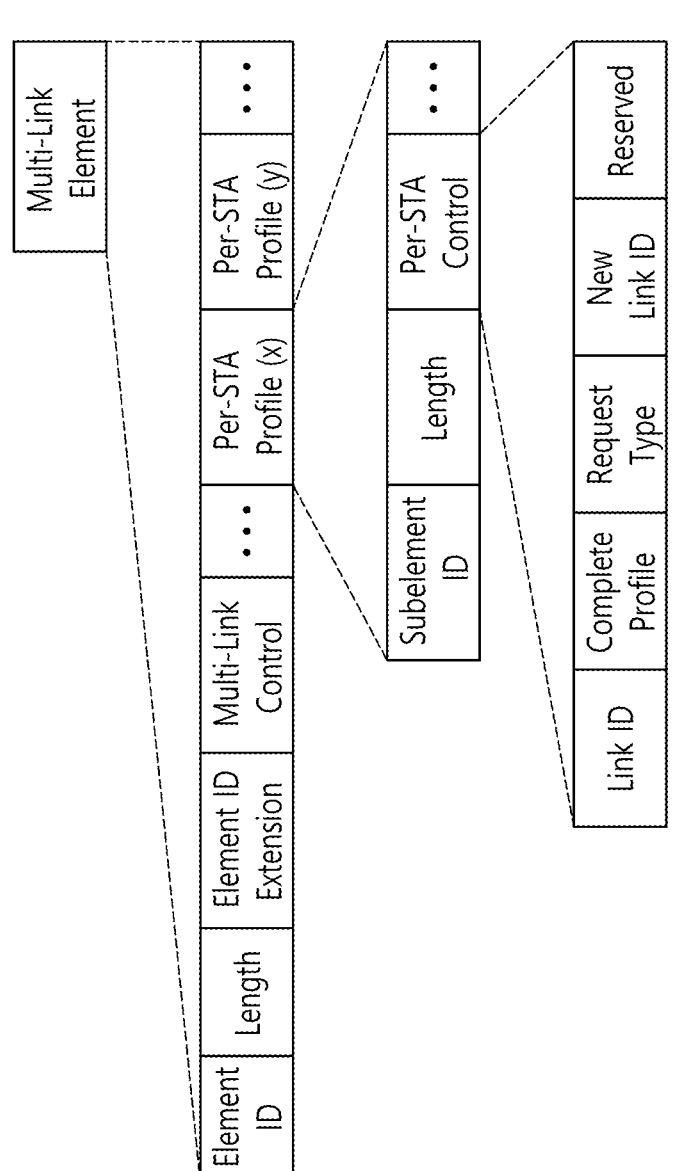
FIG. 21 shows another example of a format of a Per-STA Control field.

An embodiment of the format of the Per-STA Control field for this is shown in FIG. 21.

FIG. 21 shows another example of a format of a Per-STA Control field.

For example, when the MLD is multi-link setup as shown in FIG. 13, when the STA of the non-AP MLD wants to send an ML Reconfiguration request, it may indicate the requested Reconfiguration Type in the Request Type subfield of the Per-STA Control field of the Per-STA Profile subelement of the ML IE (ie, ML Reconfiguration variant Multi-Link element), and it may include link indication information corresponding to a link to be reconfigured in the New Link ID field.

If STA 3 wants to create Link 3 for AP 3 of AP MLD, the STA of the non-AP MLD transmits a request frame including a ML IE in which the Request Type subfield is indicated as 1 and the Link ID value corresponding to AP 3 is indicated in the New Link ID subfield through Link 1 or Link 2. In this case, the Link ID subfield becomes reserved. Upon receiving this, the AP may accept a request for STA 3 to create a link with AP 3.

If STA 2 wants to delete Link 2 previously connected to AP 2 of AP MLD, the STA of the non-AP MLD transmits a request frame including a ML IE in which the Request Type subfield is indicated as 0 and the Link ID value corresponding to AP 2 is indicated in the New Link ID subfield through Link 1 or Link 2. In this case, the Link ID subfield becomes reserved. Upon receiving this, the AP may accept a request from STA 2 to remove the link to AP 2.

If STA 2 wants to change the link to AP 3 of link 2, which is previously connected to AP 2 of the AP MLD, it indicates the Request Type subfield as 1, includes Link ID information corresponding to the currently connected AP 2 in the Link ID subfield, and the STA of the non-AP MLD transmits a request frame including an ML IE indicating a Link ID value corresponding to AP 3 in the New Link ID subfield through Link 1 or Link 2. Upon receiving this, the AP may accept a request that the STA currently connected to AP 2 change the link to AP 3.

The format of this ML IE (ie, ML Reconfiguration variant Multi-Link element) may be used even when the AP responds.

If the STA does not accept the requested ML Reconfiguration and proposes to reset to another link, it can be used as follows.

Assume that STA 2 of the non-AP MLD requests a link change from AP 2 of the AP MLD to AP 3, but the AP MLD proposes to change to AP 4 instead of AP 3 (Assuming that the AP MLD has AP 4). In this case, the STA will indicate the Request Type subfield to be 1 in the request message, include Link ID information corresponding to the currently connected AP 2 in the Link ID subfield, and transmit a request frame including an ML IE indicating a Link ID value corresponding to AP 3 in the New Link ID subfield through Link 1 or Link 2. Upon receiving this, the AP responds with a response message including an ML IE configured as follows. The Request Type subfield of the Per-STA Control field of the Per-STA Profile subelement includes the same type value 1 requested by the STA, and the Link ID subfield includes ID information corresponding to AP 3 indicated in the New Link ID subfield of the request message. By including link ID information corresponding to AP 4 proposed by the AP in the New Link ID subfield, Link information proposed by the AP for each STA can be indicated without a separate indicator.

This can also be used when the AP proposes the ADD Reconfiguration requested by the STA.

Assume that STA 3 of the non-AP MLD requests link creation to AP 3 of the AP MLD, but the AP MLD proposes to create a link with AP 4 instead of AP 3 (Assuming that the AP MLD has AP 4). In this case, the STA indicates the Request Type subfield to 1 in the request message and the Link ID subfield is in the Reserved state, and the STA will transmit a request frame including an ML IE indicating a Link ID value corresponding to AP 3 in the New Link ID subfield through Link 1 or Link 2. Upon receiving this, the AP responds with a response message including an ML IE configured as follows. The Request Type subfield of the Per-STA Control field of the Per-STA Profile subelement includes the same type value 1 requested by the STA, and the Link ID subfield includes ID information corresponding to AP 3 indicated in the New Link ID subfield of the request message. By including link ID information corresponding to AP 4 proposed by the AP in the New Link ID subfield, Link information proposed by the AP for each STA can be indicated without a separate indicator.

If a separate Requesting STA ID subfield exists, it can be indicated as follows. An example of a format corresponding to this is shown in FIG. 22.

Figure 22:
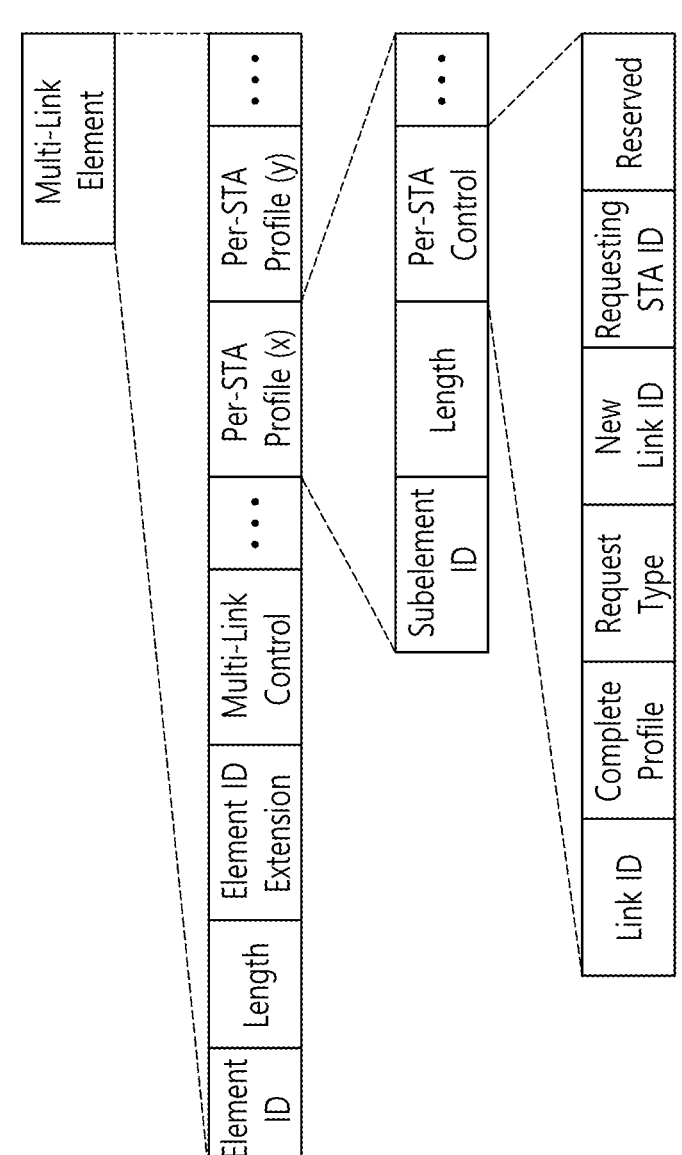
FIG. 22 shows another example of a format of a Per-STA Control field.

FIG. 22 shows another example of a format of a Per-STA Control field.

If STA 2 of the non-AP MLD requests a link change from AP 2 to AP 3 of the AP MLD, it is assumed that the AP MLD proposes to change to AP 4 rather than AP 3 (assuming that the AP MLD has AP 4). In this case, the STA will transmit the request frame through Link 1 or Link 2, and the request frame indicates the Request Type subfield to 1 in the request message, includes Link ID information corresponding to AP 2 currently connected to the Link ID subfield and includes the Link ID value corresponding to AP 3 in the New Link ID subfield and the ML IE indicating the identifier information of the requesting STA in the Requesting STA ID subfield. Upon receiving this, the AP responds with a response message including an ML IE configured as follows. The Request Type subfield of the Per-STA Control field of the Per-STA Profile subelement includes the same type value 1 requested by the STA, the same value included in the previous request message is included in the Link ID subfield (link information to which the STA is currently connected). By including link ID information corresponding to AP 4 proposed by the AP in the New Link ID subfield, Link information proposed by the AP for each STA may be indicated.

If STA 3 of the non-AP MLD requests link creation to AP 3 of the AP MLD, assume that the AP MLD proposes to create AP 4 rather than AP 3 (Assuming that the AP MLD has AP 4). In this case, the STA will transmit the request frame through Link 1 or Link 2, the request frame indicates that the Request Type subfield is 1 in the request message, the Link ID subfield is Reserved, indicates the Link ID value corresponding to AP 3 in the New Link ID subfield, and includes the ML IE indicating the identifier information of the requesting STA in the Requesting STA ID subfield. Upon receiving this, the AP responds with a response message including an ML IE configured as follows. The Request Type subfield of the Per-STA Control field of the Per-STA Profile subelement includes the same type value 1 requested by the STA, and the Link ID subfield is equally Reserved. By including link ID information corresponding to AP 4 proposed by the AP in the New Link ID subfield, Link information proposed by the AP for each STA may be indicated.

2. Definition of Complete Profile Subfield in ML Reconfiguration Variant Multi-Link Element In the 802.11be standard, the Complete Profile subfield is defined as an indicator for distinguishing whether the Profile information included in the Per-STA Profile subelement in the Per-STA Control field of the Per-STA Profile subelement of ML IE is Complete or not. If the Per-STA Profile subelement of ML IE provides a Complete Profile, the value of the Complete Profile subfield is set to 1, otherwise it is set to 0.

In this specification, the ML Reconfiguration operation is newly defined, and for this, the ML Reconfiguration variant Multi-Link element is defined in Section 1.4. At this time, the ML Reconfiguration variant Multi-Link element can also reuse the existing Complete Profile subfield to indicate information on the Profile included in the Per-STA Profile subelement, but its purpose can be defined differently. This section defines how to use the Complete Profile subfield suitable for ML Reconfiguration.

4) 'Complete Profile' (sub) field: Indicates the presence or absence of information included in the Per-STA Profile subelement. If the value of the Complete Profile subfield is 1, it means that the Per-STA Profile subelement having the Complete Profile subfield provides the Complete Profile. If the value of the Complete Profile subfield is 0, it means that the Per-STA Profile subelement having the Complete Profile subfield does not provide any elements.

For example, when an STA in a non-AP MLD ADDs or MODIFYs a link, the STA transmits the ML Reconfiguration request message including the entire information of itself (ie, the requesting STA) together with the link information that the STA wants to create or change. Therefore, when the STA ADDs or MODIFYs the Link, the value of the Complete Profile subfield of the Per-STA Control field of the Per-STA Profile subelement corresponding to the requested link is set to 1.

If the STA of the non-AP MLD DELETEs a specific link, the STA does not need to include any information of its own along with the link information it wants to remove in the ML Reconfiguration request message. Therefore, when the STA DELETEs the Link, the value of the Complete Profile subfield of the Per-STA Control field of the Per-STA Profile subelement corresponding to the requested link is set to 0.

3. Probe Request Variant Multi-Link Element

The Probe Request variant Multi-Link element is a format used when requesting information of other APs of the same AP MLD to which the corresponding AP is connected to the AP, and the Probe Request frame including the corresponding ML IE is called an ML probe request.

In the current 802.11be, when frame types other than ML probe request (e.g. (re) Association Request frame, (re) Association Probe Response frame, Probe Response frame, etc.) include ML IE, it contains the Basic variant Multi-Link element. Details on the detailed definition are defined in the 802.11be spec.

According to the contents currently defined in 802.11be, the Complete Profile subfield of the Multi-Link Control field in ML IE is defined as follows.

If the Per-STA Profile subelement of ML IE provides a complete profile, the value of the Complete Profile subfield is set to 1; otherwise, the value of the Complete Profile subfield is set to 0.

However, the content is defined when the ML IE is a Basic variant Multi-Link element, and as the Probe Request variant Multi-Link element is defined later, it is necessary to redefine the corresponding Complete Profile subfield. This specification then proposes how to use the Complete Profile subfield in the Probe Request variant Multi-Link element.

3.1 how to Use the Existing Complete Profile Subfield when Requesting Complete/Partial Information Through ML Probe Request In the current 802.11be, a method for an STA of a non-AP MLD to request complete or partial information from APs of an AP MLD through an ML probe request is defined. A summary of the contents is as follows. For reference, since the ML probe request must include the Probe Request variant Multi-Link element (type subfield=1) when including the ML IE, the ML IE included in the ML probe request means the Probe Request variant Multi-Link element.

The EHT non-AP STA requests partial information from the peer AP in one Probe Request frame and can request all or partial information from other APs indicated through the Multi-Link Element. At this time, the STA needs an indicator for distinguishing whether the information requested from the AP is complete or partial.

To this end, using the existing Complete Profile subfield defined in the Multi-Link control field of ML IE, it may indicate whether the information requested for the AP corresponding to the Per-STA Profile subelement is complete information or partial information. When the STA includes the Probe Request variant Multi-Link element in the ML probe request to request various information of other APs, the Complete Profile subfield of the Multi-Link Control field of the Per-STA Profile subelement corresponding to the requesting AP exists. At this time, when requesting complete information on the corresponding AP, the value of the Complete Profile subfield is set to 1, and when requesting partial information, the value of the Complete Profile subfield is set to 0.

Figure 23:
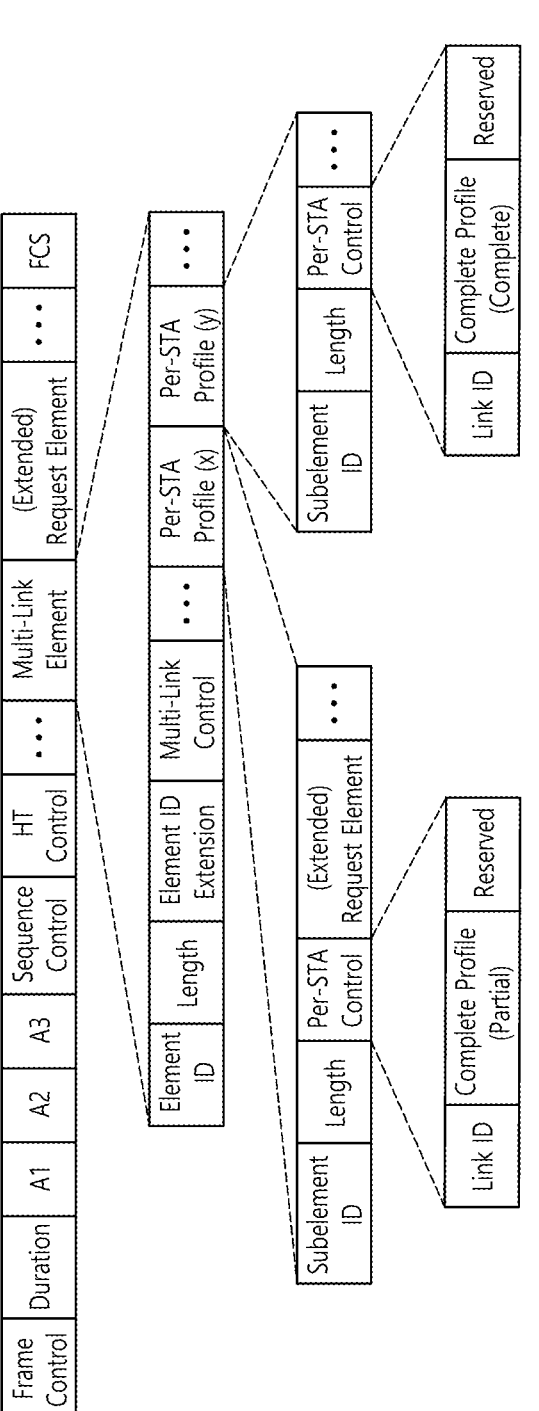
FIG. 23 shows an example of an ML probe request frame requesting complete or partial information.

An embodiment of the corresponding content is shown in FIG. 23.

FIG. 23 shows an example of an ML probe request frame requesting complete or partial information.

For example, when an STA of a non-AP MLD requests partial information from a peer AP, an (Extended) Request element is included in the body of probe request frame. In the case of requesting full information about other APs, by setting the Complete profile subfield in the Per-STA Control field to 1 without the (Extended) Request element in the Per-STA Profile of the Multi-Link Element (i.e., the probe request variant Multi-Link Element), a request for complete information on other APs may be indicated. Unlike this, if partial information is requested for other APs, an (Extended) Request element is included in the Per-STA profile and the Complete profile subfield in the Per-STA Control field is set to 0. In this case, the (Extended) Request element may be omitted according to the content defined in the 802.11be standard.

Therefore, when using the method, the Complete Profile subfield in the Multi-Link Control field of the Per-STA Profile subelement in the ML IE can be used for different purposes depending on the type of ML IE.

3.2 when Requesting Complete/Partial Information Through ML Probe Request, Define a New Subfield to Indicate this In the current 802.11be, the Complete Profile subfield is defined to distinguish whether information included in the Per-STA Profile subelement in the ML IE is a Complete Profile or not. However, as mentioned above, when an STA requests full or partial information about other APs, an indicator for distinguishing them is required. For this purpose, a new subfield is proposed.

'Complete Profile for Request' subfield: An indicator for distinguishing whether the information requested by the STA to the AP is a complete profile or a partial profile. If the value of the Complete Profile for Request subfield is 1, it means that the information requested by the STA for the corresponding AP (e.g. the AP indicated by the Link ID of the Per-STA Profile subelement) is complete information. If the value of the Complete Profile for Request subfield is 0, it means that the requested information is partial information. The Complete Profile for Request subfield may be used separately from the Complete Profile subfield indicating whether the information previously included by the STA is all information or partial information.

Figure 24:
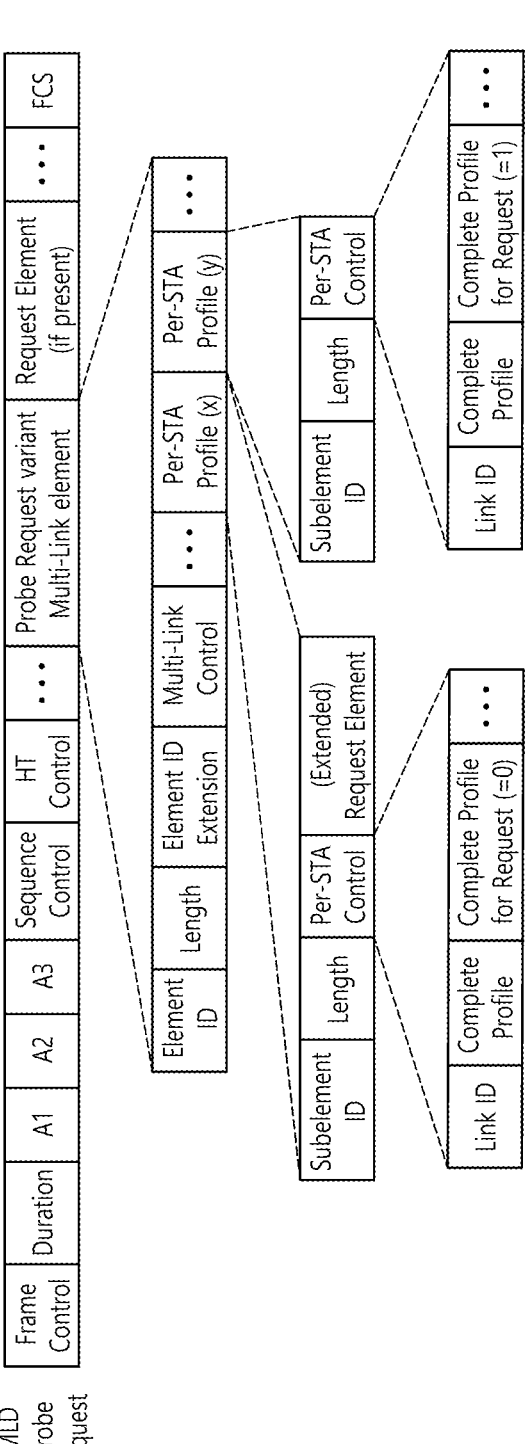
FIG. 24 shows an example of using the Complete Profile for Request subfield in the Probe Request variant Multi-Link element.

An embodiment of the corresponding subfield is shown in FIG. 24.

FIG. 24 shows an example of using the Complete Profile for Request subfield in the Probe Request variant Multi-Link element.

For example, if an STA of a non-AP MLD wants to request partial information from an AP corresponding to Per-STA Profile (x), it includes the (Extended) Request element in the Per-STA profile and sets the Complete profile for Request subfield in the Per-STA Control field to 0. At this time, the (Extended) Request element may be omitted according to the content defined in the 802.11be standard.

In addition, when the STA of the non-AP MLD requests complete information on the AP corresponding to the Per-STA Profile (y), by setting the Complete profile for Request subfield in the Per-STA Control field to 1 without the (Extended) Request element in the Per-STA Profile of the Multi-Link Element (i.e., the Probe request variant Multi-Link Element), a request for complete information about other APs may be directed.

At this time, the existing Complete Profile subfield is set according to the existing definition.

Hereinafter, the above-described embodiment will be described with reference to FIGS. 1 to 24.

Figure 25:
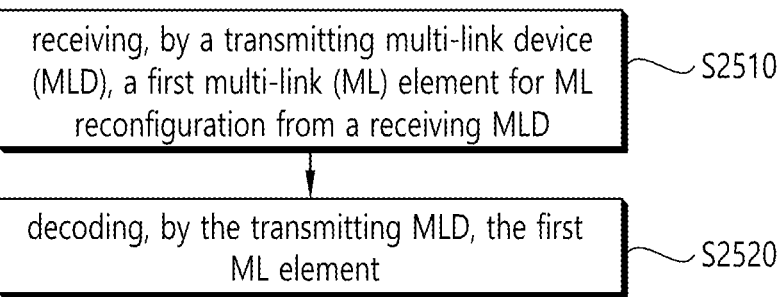
FIG. 25 is a flowchart illustrating a procedure in which a transmitting MLD receives an ML element for ML reconfiguration according to this embodiment.

FIG. 25 is a flowchart illustrating a procedure in which a transmitting MLD receives an ML element for ML reconfiguration according to this embodiment.

The example of FIG. 25 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for using a complete profile suitable for a Multi-Link (ML) element for performing ML reconfiguration between transmitting and receiving MLDs. The ML element corresponds to (ML) Reconfiguration Multi-Link element, a first transmitting STA connected to a first receiving STA included in the receiving MLD through a first link may correspond to a peer AP, and second to fourth transmitting STAs connected through different links (second to fourth links) may correspond to different APs.

In step S2510, a transmitting multi-link device (MLD) receives a first multi-link (ML) element for ML reconfiguration from a receiving MLD.

In step S2520, the transmitting MLD decodes the first ML element.

The transmitting MLD includes a first transmitting station (STA) operating on the first link and a second transmitting STA operating on a second link. The receiving MLD includes a first receiving STA operating on the first link, and a second receiving STA operating on the second link.

The first ML element includes a profile subelement of the second receiving STA. The profile subelement of the second receiving STA includes a first STA control field. The first STA control field includes a complete profile subfield.

When a value of the complete profile subfield is 1, the profile subelement of the second receiving STA includes complete information for the ML reconfiguration. When a value of the complete profile subfield is 0, the profile subelement of the second receiving STA does not include any information for the ML reconfiguration.

Specifically, when a value of the first request type subfield is 1, the ML reconfiguration may be set as an operation of adding or modifying a link. When a value of the first request type subfield is 0, the ML reconfiguration may be set to an operation of deleting a link.

For example, when a third link is added or the second link is modified due to a connection from the second transmitting STA to the third transmitting STA based on the ML reconfiguration, the value of the complete profile subfield may be set to 1, and the complete information for the ML reconfiguration may include identifier information of the third link and complete information of the second receiving STA. In this case, by setting the value of the complete profile subfield to 1, the receiving MLD may transmit the first ML element by including information on the third link to be created or information on the second link to be changed, and complete information of the second receiving STA requesting the ML reconfiguration.

When the second link is deleted based on the ML reconfiguration, the value of the complete profile subfield may be set to 0. In this case, by setting the value of the complete profile subfield to 0, the receiving MLD may transmit the first ML element without including information of the second link and any information of the second receiving STA, thereby reducing unnecessary overhead.

That is, this embodiment proposes a method in which the complete profile subfield of the first ML element is defined differently from the existing one for the ML reconfiguration. The receiving MLD may inform the transmitting MLD whether information for requesting the ML reconfiguration is included based on the complete profile subfield.

By redefining the existing complete profile subfield, necessary information can be included or unnecessary information can be excluded according to the type of the ML reconfiguration, so the overhead required to change the settings of some links of the transmitting and receiving MLDs can be reduced.

The ML reconfiguration may be a method of changing a state of some links without performing an association process, a reassociation process, or a disassociation process for all links of the transmitting and receiving MLDs.

The transmitting MLD may further include a third transmitting STA, and the receiving MLD may further include a third receiving STA.

For the transmitting and receiving MLDs, the first and second links may be established, and a third link that can be connected between the third transmitting and receiving STAs may not be established. That is, based on multi-link configuration, the first transmitting and receiving STAs are connected to the first link, and the second transmitting and receiving STAs are connected to the second link, but the third transmitting and receiving STAs are not connected to the third link.

The first STA control field may further include a first link identifier (ID) subfield and a first request type subfield.

The first link ID subfield may include identifier information of a link to be changed by the second receiving STA. The first request type subfield may include information on a type of the ML reconfiguration.

When a value of the first request type subfield is 0, the ML reconfiguration may be set to an operation of deleting a link. When a value of the first request type subfield is 1, the ML reconfiguration may be set to an operation of adding or modifying a link.

For example, when identifier information of the third link is included in the first link ID subfield and the value of the first request type subfield is 1, when there is no link connected to the second receiving STA, an operation to add the third link may be requested, and when there is a link connected to the second receiving STA, an operation to modify the second link may be requested through a connection from the second transmitting STA to the third transmitting STA.

When identifier information of the second link is included in the first link ID subfield and the value of the first request type subfield is 0, an operation to remove the second link may be requested.

As another example, the first STA control field may further include a second link ID subfield. The second link ID subfield may include identifier information of a link to which the second receiving STA is currently connected.

When identifier information of the third link is included in the first link ID subfield, the second link ID subfield is reserved, and the value of the first request type subfield is 1, an operation to add the third link may be requested.

When identifier information of the second link is included in the first link ID subfield, and the second link ID subfield is reserved, and the value of the first request type subfield is 0, an operation to remove the second link may be requested.

When identifier information of the third link is included in the first link ID subfield, the second link ID subfield includes identifier information of the second link, and the value of the first request type subfield is 1, an operation to modify the second link may be requested through a connection from the second transmitting STA to the third transmitting STA.

Also, the receiving MLD may receive a second ML element for the ML reconfiguration from the transmitting MLD through the first link. That is, the receiving MLD may request the ML reconfiguration based on the first ML element, and the transmitting MLD may respond to a request of the ML reconfiguration based on the second ML element.

The second ML element may include a profile subelement of a second transmitting STA. The profile subelement of the second transmitting STA may include a second STA control field.

The second STA control field may include a second request type subfield, a third link ID subfield, and a fourth link ID subfield. The second request type subfield may include information a type of the ML reconfiguration. The third link ID subfield may include identifier information of a link to be changed by the second receiving STA. The fourth link ID subfield may include identifier information of a link to be changed by the transmitting MLD.

The transmitting MLD may further include a fourth transmitting STA, and the receiving MLD may further include a fourth receiving STA. For the transmitting and receiving MLDs, a fourth link that can be connected between the fourth transmitting and receiving STAs may not be established. That is, the fourth transmitting and receiving STAs are not connected through the fourth link.

In this case, the transmitting MLD may propose or respond to a change to another link, instead of a change of some links requested based on the first ML element, based on the second ML element.

For example, when the first link ID subfield includes identifier information of the third link, the second link ID subfield includes identifier information of the second link, and the value of the first request type subfield is 1, the operation to modify the second link may be requested through the connection from the second transmitting STA to the third transmitting STA.

At this time, when the third link ID subfield includes identifier information of the third link, the fourth link ID subfield includes an identifier of a link for the fourth transmitting STA, and the value of the second request type subfield is equal to the value of the first request type subfield, the operation of modifying the second link may be responded through a connection from the second transmitting STA to the fourth transmitting STA. That is, the transmitting MLD may propose or respond to modifying the second link through a connection to the fourth transmitting STA instead of a connection to the third transmitting STA requested by the receiving MLD. This has an effect that the AP can indicate link information for each STA through the second ML element without adding a separate indicator.

As another example, when the first link ID subfield includes identifier information of the third link, the second link ID subfield is reserved, and the value of the first request type subfield is 1, the operation to add the third link may be requested.

At this time, when the third link ID subfield includes identifier information of the third link, the fourth link ID subfield includes an identifier of the fourth link, and the value of the second request type subfield is equal to the value of the first request type subfield, an operation of adding the fourth link other than the third link may be responded. That is, the transmitting MLD may propose or respond to the addition of the fourth link rather than the addition of the third link requested by the receiving MLD. Similarly, there is an effect that the AP can indicate link information for each STA through the second ML element without adding a separate indicator.

The first and second ML elements may further include an ML control field. The ML Control field may include a type subfield for types of the first and second ML elements. When a value of the type subfield is 2, the first and second ML elements may be used for the ML reconfiguration. When a value of the type subfield is 0, the first and second ML elements may be basic ML elements. When a value of the type subfield is 1, the first and second ML elements may be probe request ML elements.

The first STA control field may further include a STA MAC address present subfield. When the value of the STA MAC address present subfield is 1, the profile subelement of the second receiving STA may further include an STA MAC address subfield. The STA MAC address subfield may include information on a MAC address of the second receiving STA. The ML reconfiguration is requested by the second receiving STA based on the MAC address of the second receiving STA.

When the value of the STA MAC address present subfield is 0, the profile subelement of the second receiving STA does not include the STA MAC address subfield, and the first STA control field may further include a requesting STA ID subfield. The requesting STA ID subfield may include identifier information of an STA requesting the ML reconfiguration. That is, the ML reconfiguration is requested by the receiving STA indicated by the identifier of the STA included in the requesting STA ID subfield. This embodiment proposes a method for notifying the information of the STA requesting the ML reconfiguration based on the identifier of the STA included in the requesting STA ID subfield.

Figure 26:
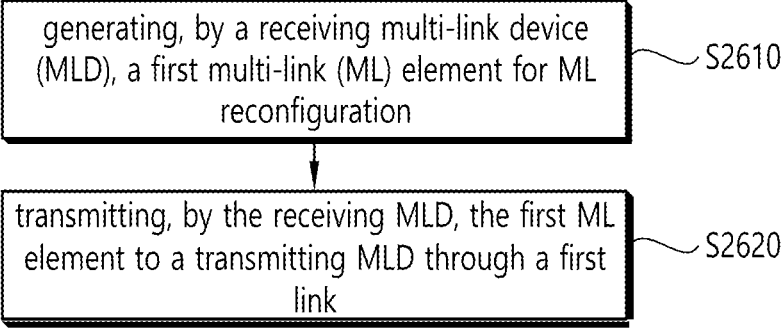
FIG. 26 is a flowchart illustrating a procedure in which a receiving MLD transmits an ML element for ML reconfiguration according to this embodiment.

FIG. 26 is a flowchart illustrating a procedure in which a receiving MLD transmits an ML element for ML reconfiguration according to this embodiment.

The example of FIG. 26 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for using a complete profile suitable for a Multi-Link (ML) element for performing ML reconfiguration between transmitting and receiving MLDs. The ML element corresponds to (ML) Reconfiguration Multi-Link element, a first transmitting STA connected to a first receiving STA included in the receiving MLD through a first link may correspond to a peer AP, and second to fourth transmitting STAs connected through different links (second to fourth links) may correspond to different APs.

In step S2610, a receiving multi-link device (MLD) generates a first multi-link (ML) element for ML reconfiguration.

In step S2620, the receiving MLD transmits the first ML element to a transmitting MLD through a first link.

The transmitting MLD includes a first transmitting station (STA) operating on the first link and a second transmitting STA operating on a second link. The receiving MLD includes a first receiving STA operating on the first link, and a second receiving STA operating on the second link.

The first ML element includes a profile subelement of the second receiving STA. The profile subelement of the second receiving STA includes a first STA control field. The first STA control field includes a complete profile subfield.

When a value of the complete profile subfield is 1, the profile subelement of the second receiving STA includes complete information for the ML reconfiguration. When a value of the complete profile subfield is 0, the profile subelement of the second receiving STA does not include any information for the ML reconfiguration.

Specifically, when a value of the first request type subfield is 1, the ML reconfiguration may be set as an operation of adding or modifying a link. When a value of the first request type subfield is 0, the ML reconfiguration may be set to an operation of deleting a link.

For example, when a third link is added or the second link is modified due to a connection from the second transmitting STA to the third transmitting STA based on the ML reconfiguration, the value of the complete profile subfield may be set to 1, and the complete information for the ML reconfiguration may include identifier information of the third link and complete information of the second receiving STA. In this case, by setting the value of the complete profile subfield to 1, the receiving MLD may transmit the first ML element by including information on the third link to be created or information on the second link to be changed, and complete information of the second receiving STA requesting the ML reconfiguration.

When the second link is deleted based on the ML reconfiguration, the value of the complete profile subfield may be set to 0. In this case, by setting the value of the complete profile subfield to 0, the receiving MLD may transmit the first ML element without including information of the second link and any information of the second receiving STA, thereby reducing unnecessary overhead.

That is, this embodiment proposes a method in which the complete profile subfield of the first ML element is defined differently from the existing one for the ML reconfiguration. The receiving MLD may inform the transmitting MLD whether information for requesting the ML reconfiguration is included based on the complete profile subfield.

By redefining the existing complete profile subfield, necessary information can be included or unnecessary information can be excluded according to the type of the ML reconfiguration, so the overhead required to change the settings of some links of the transmitting and receiving MLDs can be reduced.

The ML reconfiguration may be a method of changing a state of some links without performing an association process, a reassociation process, or a disassociation process for all links of the transmitting and receiving MLDs.

The transmitting MLD may further include a third transmitting STA, and the receiving MLD may further include a third receiving STA.

For the transmitting and receiving MLDs, the first and second links may be established, and a third link that can be connected between the third transmitting and receiving STAs may not be established. That is, based on multi-link configuration, the first transmitting and receiving STAs are connected to the first link, and the second transmitting and receiving STAs are connected to the second link, but the third transmitting and receiving STAs are not connected to the third link.

The first STA control field may further include a first link identifier (ID) subfield and a first request type subfield.

The first link ID subfield may include identifier information of a link to be changed by the second receiving STA. The first request type subfield may include information on a type of the ML reconfiguration.

When a value of the first request type subfield is 0, the ML reconfiguration may be set to an operation of deleting a link. When a value of the first request type subfield is 1, the ML reconfiguration may be set to an operation of adding or modifying a link.

For example, when identifier information of the third link is included in the first link ID subfield and the value of the first request type subfield is 1, when there is no link connected to the second receiving STA, an operation to add the third link may be requested, and when there is a link connected to the second receiving STA, an operation to modify the second link may be requested through a connection from the second transmitting STA to the third transmitting STA.

When identifier information of the second link is included in the first link ID subfield and the value of the first request type subfield is 0, an operation to remove the second link may be requested.

As another example, the first STA control field may further include a second link ID subfield. The second link ID subfield may include identifier information of a link to which the second receiving STA is currently connected.

When identifier information of the third link is included in the first link ID subfield, the second link ID subfield is reserved, and the value of the first request type subfield is 1, an operation to add the third link may be requested.

When identifier information of the second link is included in the first link ID subfield, and the second link ID subfield is reserved, and the value of the first request type subfield is 0, an operation to remove the second link may be requested.

When identifier information of the third link is included in the first link ID subfield, the second link ID subfield includes identifier information of the second link, and the value of the first request type subfield is 1, an operation to modify the second link may be requested through a connection from the second transmitting STA to the third transmitting STA.

Also, the receiving MLD may receive a second ML element for the ML reconfiguration from the transmitting MLD through the first link. That is, the receiving MLD may request the ML reconfiguration based on the first ML element, and the transmitting MLD may respond to a request of the ML reconfiguration based on the second ML element.

The second ML element may include a profile subelement of a second transmitting STA. The profile subelement of the second transmitting STA may include a second STA control field.

The second STA control field may include a second request type subfield, a third link ID subfield, and a fourth link ID subfield. The second request type subfield may include information a type of the ML reconfiguration. The third link ID subfield may include identifier information of a link to be changed by the second receiving STA. The fourth link ID subfield may include identifier information of a link to be changed by the transmitting MLD.

The transmitting MLD may further include a fourth transmitting STA, and the receiving MLD may further include a fourth receiving STA. For the transmitting and receiving MLDs, a fourth link that can be connected between the fourth transmitting and receiving STAs may not be established. That is, the fourth transmitting and receiving STAs are not connected through the fourth link.

In this case, the transmitting MLD may propose or respond to a change to another link, instead of a change of some links requested based on the first ML element, based on the second ML element.

For example, when the first link ID subfield includes identifier information of the third link, the second link ID subfield includes identifier information of the second link, and the value of the first request type subfield is 1, the operation to modify the second link may be requested through the connection from the second transmitting STA to the third transmitting STA.

At this time, when the third link ID subfield includes identifier information of the third link, the fourth link ID subfield includes an identifier of a link for the fourth transmitting STA, and the value of the second request type subfield is equal to the value of the first request type subfield, the operation of modifying the second link may be responded through a connection from the second transmitting STA to the fourth transmitting STA. That is, the transmitting MLD may propose or respond to modifying the second link through a connection to the fourth transmitting STA instead of a connection to the third transmitting STA requested by the receiving MLD. This has an effect that the AP can indicate link information for each STA through the second ML element without adding a separate indicator.

As another example, when the first link ID subfield includes identifier information of the third link, the second link ID subfield is reserved, and the value of the first request type subfield is 1, the operation to add the third link may be requested.

At this time, when the third link ID subfield includes identifier information of the third link, the fourth link ID subfield includes an identifier of the fourth link, and the value of the second request type subfield is equal to the value of the first request type subfield, an operation of adding the fourth link other than the third link may be responded. That is, the transmitting MLD may propose or respond to the addition of the fourth link rather than the addition of the third link requested by the receiving MLD. Similarly, there is an effect that the AP can indicate link information for each STA through the second ML element without adding a separate indicator.

The first and second ML elements may further include an ML control field. The ML Control field may include a type subfield for types of the first and second ML elements. When a value of the type subfield is 2, the first and second ML elements may be used for the ML reconfiguration. When a value of the type subfield is 0, the first and second ML elements may be basic ML elements. When a value of the type subfield is 1, the first and second ML elements may be probe request ML elements.

The first STA control field may further include a STA MAC address present subfield. When the value of the STA MAC address present subfield is 1, the profile subelement of the second receiving STA may further include an STA MAC address subfield. The STA MAC address subfield may include information on a MAC address of the second receiving STA. The ML reconfiguration is requested by the second receiving STA based on the MAC address of the second receiving STA.

When the value of the STA MAC address present subfield is 0, the profile subelement of the second receiving STA does not include the STA MAC address subfield, and the first STA control field may further include a requesting STA ID subfield. The requesting STA ID subfield may include identifier information of an STA requesting the ML reconfiguration. That is, the ML reconfiguration is requested by the receiving STA indicated by the identifier of the STA included in the requesting STA ID subfield. This embodiment proposes a method for notifying the information of the STA requesting the ML reconfiguration based on the identifier of the STA included in the requesting STA ID subfield.

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure generates a first multi-link (ML) element for ML reconfiguration; and transmits the first ML element to a transmitting MLD through a first link.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including generating a first multi-link (ML) element for ML reconfiguration; and transmitting the first ML element to a transmitting MLD through a first link. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a non-access point (non-AP) multi-link device (MLD) in a wireless local area network (WLAN) system, the method comprising:
    generating, by a first non-AP station (STA) affiliated with the non-AP MLD, a first reconfiguration multi-link (ML) element; and
    transmitting, by the first non-AP STA, the first reconfiguration ML element to a first AP affiliated with an AP MLD,
    wherein the first AP operating on a first link and a second AP operating on a second link are affiliated with the AP MLD,
    wherein the first non-AP STA operating on the first link and a second non-AP STA operating on the second link are affiliated with the non-AP MLD,
    wherein the first reconfiguration ML element includes a profile subelement of the second non-AP STA,
    wherein the profile subelement of the second non-AP STA includes a first STA control field,
    wherein the first STA control field includes a complete profile subfield,
    wherein, based on a value of the complete profile subfield being 1, the profile subelement of the second non-AP STA includes complete information for ML reconfiguration,
    wherein the first STA control field further includes a first link identifier (ID) subfield and a first reconfiguration operation type subfield,
    wherein the first link ID subfield includes identifier information of a link for the ML reconfiguration is indicated,
    wherein the first reconfiguration operation type subfield indicates a type of a reconfiguration operation,
    wherein, based on a value of the first reconfiguration operation type subfield being a first value, the type of the reconfiguration operation is set to Delete Link, and
    wherein, based on a value of the first reconfiguration operation type subfield being a second value, the type of the reconfiguration operation is set to Add Link.

2. The method of claim 1,
    wherein, based on a value of the complete profile subfield being 0, the profile subelement of the second non-AP STA does not include any information for the ML reconfiguration, and
    wherein the ML reconfiguration is a method of changing a state of some links without performing an association process, a reassociation process, or a disassociation process for all links of the AP and non-AP MLDs.

3. The method of claim 1,
    wherein a third AP is further affiliated with the AP MLD,
    wherein a third non-AP STA is further affiliated with the non-AP MLD, and
    wherein, for the AP and non-AP MLDs, the first and second links are established, and a third link that can be connected between the third AP and the third non-AP STA is not established.

4. The method of claim 3,
    wherein based on the third link being added or the second link being modified due to a connection from the second AP to the third AP based on the ML reconfiguration, the value of the complete profile subfield is set to 1, and the complete information for the ML reconfiguration includes identifier information of the third link and complete information of the second non-AP STA, and wherein, based on the second link being deleted based on the ML reconfiguration, the value of the complete profile subfield is set to 0.

5. The method of claim 3, wherein, based on identifier information of the third link is being included in the first link ID subfield and the value of the first reconfiguration operation type subfield being the second value:

based on there is no link connected to the second non-AP STA, an operation to add the third link is requested, and based on there is a link connected to the second non-AP STA, an operation to modify the second link is requested through a connection from the second AP to the third AP.

6. The method of claim 1, wherein, based on identifier information of the second link being included in the first link ID subfield and the value of the first reconfiguration operation type subfield being the first value, an operation to delete the second link is requested.

7. The method of claim 3, wherein the first STA control field further includes a second link ID subfield, wherein the second link ID subfield includes identifier information of a link to which the second non-AP STA is currently connected, wherein, based on identifier information of the third link being included in the first link ID subfield, the second link ID subfield being reserved, and the value of the first reconfiguration operation type subfield being the second value, an operation to add the third link is requested, wherein, based on identifier information of the second link being included in the first link ID subfield, and the second link ID subfield being reserved, and the value of the first reconfiguration operation type subfield being the first value, an operation to delete the second link is requested, wherein, based on identifier information of the third link being included in the first link ID subfield, the second link ID subfield including identifier information of the second link, and the value of the first reconfiguration operation type subfield being the second value, an operation to modify the second link is requested through a connection from the second AP to the third AP.

8. The method of claim 7, further comprising:

receiving, by the first non-AP STA, a second reconfiguration ML element from the first AP, wherein the second reconfiguration ML element includes a profile subelement of the second AP, wherein the profile subelement of the second AP includes a second STA control field, wherein the second STA control field includes a second reconfiguration operation type subfield, a third link ID subfield, and a fourth link ID subfield, wherein the second reconfiguration operation type subfield includes information a type of the reconfiguration operation, wherein the third link ID subfield includes identifier information of a link to be changed by the second non-AP STA, wherein the fourth link ID subfield includes identifier information of a link to be changed by the AP MLD, wherein a fourth AP is further affiliated with the AP MLD, wherein a fourth non-AP STA is further affiliated with the non-AP MLD, wherein, for the AP and non-AP MLDs, a fourth link that can be connected between the fourth AP and the fourth non-AP STA is not established.

9. The method of claim 8, wherein, based on the first link ID subfield including identifier information of the third link, the second link ID subfield including identifier information of the second link, and the value of the first reconfiguration operation type subfield being the second value, the operation to modify the second link is requested through the connection from the second AP to the third AP, and wherein, based on the third link ID subfield including identifier information of the third link, the fourth link ID subfield including an identifier of a link for the fourth AP, and the value of the second reconfiguration operation type subfield being equal to the value of the first reconfiguration operation type subfield, the operation of modifying the second link is responded through a connection from the second AP to the fourth AP.

10. The method of claim 8, wherein, based on the first link ID subfield including identifier information of the third link, the second link ID subfield including reserved, and the value of the first reconfiguration operation type subfield being the second value, the operation to add the third link is requested, and wherein, based on the third link ID subfield including identifier information of the third link, the fourth link ID subfield including an identifier of the fourth link, and the value of the second reconfiguration operation type subfield being equal to the value of the first reconfiguration operation type subfield, an operation of adding the fourth link other than the third link is responded.

11. The method of claim 8, wherein the first and second reconfiguration ML elements further include an ML control field, wherein the ML Control field includes a type subfield for types of the first and second reconfiguration ML elements.

12. A non-access point (non-AP) multi-link device (MLD) in a wireless local area network (WLAN) system, the non-AP MLD comprising:

a memory;

a transceiver; and a processor operatively coupled to the memory and the transceiver, wherein processor is configured to:

generate, by a first non-AP station (STA) affiliated with the non-AP MLD, a first reconfiguration multi-link (ML) element; and transmit, by the first non-AP STA, the first reconfiguration ML element to a first AP affiliated with an AP MLD, wherein the first AP operating on a first link and a second AP operating on a second link are affiliated with the AP MLD, wherein the first non-AP STA operating on the first link and a second non-AP STA operating on the second link are affiliated with the non-AP MLD, wherein the first reconfiguration ML element includes a profile subelement of the second non-AP STA, wherein the profile subelement of the second non-AP STA includes a first STA control field, wherein the first STA control field includes a complete profile subfield, wherein, based on a value of the complete profile subfield being 1, the profile subelement of the second non-AP STA includes complete information for ML reconfiguration, wherein the first STA control field further includes a first link identifier (ID) subfield and a first reconfiguration operation type subfield, wherein the first link ID subfield includes identifier information of a link for the ML reconfiguration is indicated, wherein the first reconfiguration operation type subfield indicates a type of a reconfiguration operation, wherein, based on a value of the first reconfiguration operation type subfield being a first value, the type of the reconfiguration operation is set to Delete Link, and wherein, based on a value of the first reconfiguration operation type subfield being a second value, the type of the reconfiguration operation is set to Add Link.

13. A method performed by an access point (AP) multi-link device (MLD) in a wireless local area network (WLAN) system, the method comprising:

receiving, by a first AP affiliated with the AP MLD, a first reconfiguration multi-link (ML) element from a first non-AP station (STA) affiliated with a non-AP MLD; and decoding, by the first AP, the first reconfiguration ML element, wherein the first AP operating on a first link and a second AP operating on a second link are affiliated with the AP MLD, wherein the first non-AP STA operating on the first link and a second non-AP STA operating on the second link are affiliated with the non-AP MLD, wherein the first reconfiguration ML element includes a profile subelement of the second non-AP STA, wherein the profile subelement of the second non-AP STA includes a first STA control field, wherein the first STA control field includes a complete profile subfield, wherein, based on a value of the complete profile subfield being 1, the profile subelement of the second non-AP STA includes complete information for ML reconfiguration, wherein the first STA control field further includes a first link identifier (ID) subfield and a first reconfiguration operation type subfield, wherein the first link ID subfield includes identifier information of a link for the ML reconfiguration is indicated, wherein the first reconfiguration operation type subfield indicates a type of a reconfiguration operation, wherein, based on a value of the first reconfiguration operation type subfield being a first value, the type of the reconfiguration operation is set to Delete Link, and wherein, based on a value of the first reconfiguration operation type subfield being a second value, the type of the reconfiguration operation is set to Add Link.

14. The method of claim 13, wherein based on a value of the complete profile subfield being 0, the profile subelement of the second non-AP STA does not include any information for the ML reconfiguration, and wherein the ML reconfiguration is a method of changing a state of some links without performing an association process, a reassociation process, or a disassociation process for all links of the AP and non-AP MLDs.

15. The method of claim 13, wherein a third AP is further affiliated with the AP MLD, wherein a third non-AP STA is further affiliated with the non-AP MLD, and wherein, for the AP and non-AP MLDs, the first and second links are established, and a third link that can be connected between the third AP and the third non-AP STA is not established.

* * * * *